United States Patent
Geva

(10) Patent No.: US 11,372,677 B1
(45) Date of Patent: Jun. 28, 2022

(54) EFFICIENT SCHEDULING OF LOAD INSTRUCTIONS

(71) Applicant: Amazon Technologies, Inc., Seattle, WA (US)

(72) Inventor: Robert Geva, Cupertino, CA (US)

(73) Assignee: Amazon Technologies, Inc., Seattle, WA (US)

(*) Notice: Subject to any disclaimer, the term of this patent is extended or adjusted under 35 U.S.C. 154(b) by 180 days.

(21) Appl. No.: 16/892,692

(22) Filed: Jun. 4, 2020

(51) Int. Cl.
  *G06F 9/38* (2018.01)
  *G06F 9/48* (2006.01)
  *G06N 3/02* (2006.01)
  *G06F 9/30* (2018.01)

(52) U.S. Cl.
  CPC ........ *G06F 9/4881* (2013.01); *G06F 9/30043* (2013.01); *G06F 9/383* (2013.01); *G06F 9/3826* (2013.01); *G06N 3/02* (2013.01)

(58) Field of Classification Search
  None
  See application file for complete search history.

(56) References Cited

U.S. PATENT DOCUMENTS

2019/0087195 A1* 3/2019 Lloyd ................. G06F 9/30123
2019/0108022 A1* 4/2019 Lloyd ................. G06F 12/1009

* cited by examiner

*Primary Examiner* — Scott C Sun
(74) *Attorney, Agent, or Firm* — Weaver Austin Villeneuve & Sampson LLP

(57) ABSTRACT

When scheduling instructions for execution on a computing device, load instructions are processed before their dependent computational instructions. This can result in the load instructions being scheduled in a non-optimal order. To schedule the load instructions in a preferred order, a scheduler can speculatively schedule the load instructions without committing to their order. Subsequently, when the scheduler encounters the dependent computational instructions, the scheduler can reorder the speculatively scheduled load instructions according to the execution order of the dependent computational instructions.

20 Claims, 20 Drawing Sheets

Ordered_List: { INIT, L1, L2, L3, CA1, CB1, CC1, CC2, CB2, CA2 }

Ordered_list: { INIT, L1, L2, L3 }
Most_recently_committed: { INIT }
Candidate_list: { CA1, CB1, CC1 }
Speculatively_scheduled_loads: { (L1, INIT), (L2, INIT), (L3, INIT) }

Ordered_list: { INIT, L1, L2, L3 }
Most_recently_committed: { INIT }
Candidate_list: { CA1, CB1, CC1 }
Speculatively_scheduled_loads: { (L1, INIT), (L2, INIT), (L3, INIT) }

CA2: { L1 }
CB2: { L2 }
CC2: { L3 }

Ordered_list: { INIT, L1, L2, L3, CA1, CB1, CC1 }
Most_recently_committed: { INIT }
Candidate_list: { CC2, CB2, CA2 }
Speculatively_scheduled_loads: { (L1, INIT), (L2, INIT), (L3, INIT) }

CA2: { L1 }
CB2: { L2 }
CC2: { L3 }

Ordered_list: { INIT, L1, L2, L3, CA1, CB1, CC1, CC2 }
Most_recently_committed: { INIT }
Candidate_list: { CB2, CA2 }
Speculatively_scheduled_loads: { (L1, INIT), (L2, INIT), (L3, INIT) }

CA2: { L1 }
CB2: { L2 }
CC2: { L3 }

Ordered_list: { INIT, L3, L1, L2, CA1, CB1, CC1, CC2 }
Most_recently_committed: { L3 }
Candidate_list: { CB2, CA2 }
Speculatively_scheduled_loads: { (L1, L3), (L2, L3) }

CA2: { L1 }
CB2: { L2 }
CC2: { }

Ordered_list: { INIT, L3, L1, L2, CA1, CB1, CC1, CC2, CB2 }
Most_recently_committed: { L3 }
Candidate_list: { CA2 }
Speculatively_scheduled_loads: { (L1, L3), (L2, L3) }

CA2: { L1 }
CB2: { L2 }
CC2: { }

Ordered_list: { INIT, L3, L2, L1, CA1, CB1, CC1, CC2, CB2, CA2 }
Most_recently_committed: { L1 }
Candidate_list: { }
Speculatively_scheduled_loads: { }

CA2: { }
CB2: { }
CC2: { }

EFFICIENT SCHEDULING OF LOAD INSTRUCTIONS

BACKGROUND

A compiler is a software tool that interprets programming code, and generates machine instructions suitable for execution on a computing device to implement the objective of the programming code. In addition to generating instructions, a compiler may also include an instruction scheduler to schedule and distribute the generated instructions to different execution engines of the computing device.

BRIEF DESCRIPTION OF THE DRAWINGS

Various embodiments in accordance with the present disclosure will be described with reference to the drawings, in which.

DETAILED DESCRIPTION

Figure 1:
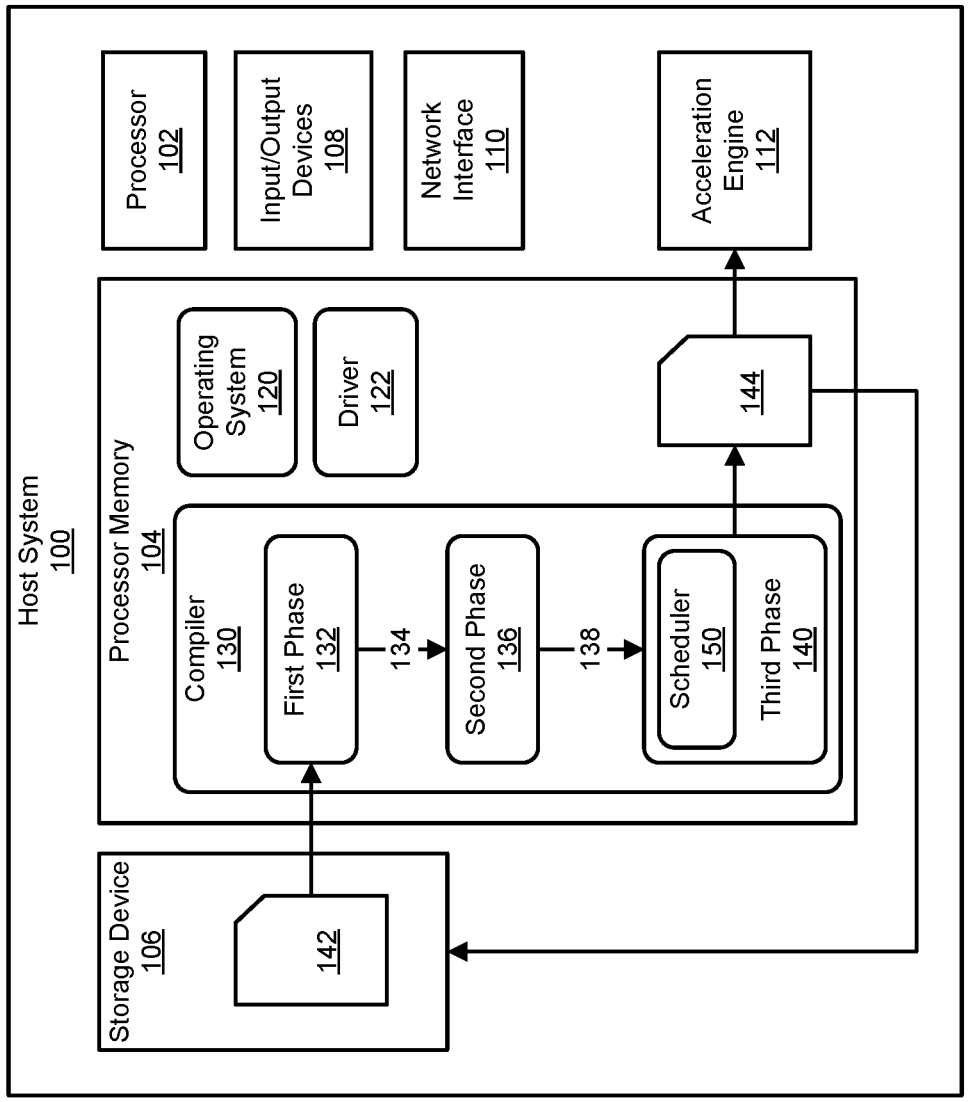
FIG. 1 includes a block diagram that illustrates an example of a host system having a compiler.

Instructions executed by computing devices (e.g., processors, acceleration engines, etc.) can generally be categorized into memory access instructions that obtain data from or store data to memory, and computational instructions that consume and manipulate the data inside the computing device. For load instructions that are executed to retrieve data from memory, a compiler can schedule the load instructions according to when the data is available for reading from the memory. For computational instructions, the compiler may schedule the computational instructions based on the availability of execution engines in the computing device to achieve execution parallelism. Because a load instruction is executed to retrieve data before a computational instruction is executed to consume that data, load instructions are typically scheduled before their dependent computational instructions. However, load instructions typically require a longer latency to complete than computation instructions, because the computing device has to interface with a memory external to the computing device. As such, there can be times when a computing device sits idle while waiting for data to be loaded from memory.

To minimize idle time and hide the latency of load instructions, the preferred ordering of load instructions is to have loads for computational instructions that occur first be executed first. In other words, the preferred ordering of the load instructions is to execute them in a sequence that corresponds to the execution order of the dependent computational instructions. In this manner, the data required by a computational instruction that is executed first can be obtained from memory first, such that the data will be readily available when the computing device executes the computational instruction. However, because a scheduler will encounter and schedule the load instructions before their dependent computational instructions, the order in which the subsequent computational instructions are executed may not be known at the time of scheduling the load instructions. The situation can be exacerbated when scheduling instructions for a neural network, because there can be hundreds of thousands or even millions of computational instructions with the number of load instructions being in the same order of magnitude.

To arrange load instructions in the preferred order, when the instruction scheduler of a compiler encounters a set of load instructions before their dependent computational instructions, the scheduler can speculatively schedule the load instructions without committing to their order. Subsequently, when the scheduler encounters the dependent computational instructions, the scheduler can reorder the speculatively scheduled load instructions according to the execution order of the dependent computational instructions. The scheduler can accomplish such reordering of load instructions by maintaining a list of speculatively scheduled load instructions, and keeping track of the load instructions that a computational instruction depends on. When a computational instruction is scheduled, the scheduler determines if any of the load instructions required by the computational instruction is still on the list of speculatively scheduled load instructions. If the load instruction is still on the list of speculatively scheduled load instructions, the load instruction is moved up in the ordering of instructions to follow the most recently committed instruction. The position of that load instruction is then committed by the scheduler, and that load instruction is set as the most recently committed instruction. The committed load instruction is then removed from the list of speculatively scheduled load instruction to prevent the list from growing too large. Once all the speculatively scheduled load instructions of the computational instruction have been reordered and committed, the process continues in a similar manner with the next instruction to schedule until all instructions have been scheduled.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 includes a block diagram illustrating an example of a host system 100 on which a compiler 130, such as is described herein, can run. The illustrated host system 100 is an example of a computing device, and includes a processor 102, a processor memory 104, at least one storage device 106, various Input/Output (I/O) devices 108, and at least one network interface 110. In the example of FIG. 1, the host system 100 also includes an acceleration engine 112, which is an integrated circuit device that can accelerate certain operations or computations performed by the host system 100. In various examples, the host system 100 can be implemented as a server in a data center, a desktop computer, a laptop computer, a tablet computer, or a smartphone, among other examples. In some examples, operations or components discussed below as being performed or included in the host system 100 can be performed or included in other computer devices. For example, the compiler 130 can execute on the host system 100 while the acceleration engine 112 is located at a different host system.

The processor 102 is an integrated circuit device that can execute program code, in the form of instructions. The program code can be for various software applications or tools, such as an operating system 120 or the illustrated compiler 130. While the processor 102 is executing a program, the instructions for the program can be stored in the processor memory 104. The instructions can also be stored elsewhere, such as on the storage device 106, and can be loaded into the processor memory 104 when needed by the processor 102. The processor 102 can also use the processor memory 104 for temporary storage of other data on which the processor 102 is operating. In various examples, the processor memory 104 is a volatile memory type, such as a type of Random Access Memory, though non-volatile memory types can, alternatively or additionally, be used for the processor memory 104.

The storage device 106 is an example of a device that can include non-volatile memory. For example, the storage device 106 can be a magnetic disk drive, a solid state drive, or an optical drive, among other examples. The storage device 106 can further be non-transitory, such that program code and other data stored on the storage device 106 remains present when the storage device 106 is not powered on.

The storage device 106 is one example of a peripheral device, which are components that can be coupled to the host system 100 to add functionality to the host system 100. Other examples of peripheral devices include the Input/Output devices 108 and the network interface 110. The Input/Output devices 108 can include user input and output devices, such as keyboards, mice, touch screens, microphones, display screens, speakers, printers, and scanners, among other examples. The network interface 110, which can be implemented using a network interface card, can provide access to one or more networks. The network interface 110 can include, for example, a physical port for connecting a network cable and/or wireless antennas for communicating with Wi-Fi and/or cellular networks. The network interface 110 can also be described as an I/O device.

The acceleration engine 112 is also another type of peripheral device or I/O device. The acceleration engine 112 is a device that is purpose-built to perform certain operations that can be performed by the processor 102, but can be performed faster by the acceleration engine 112. For example, the acceleration engine 112 can be a neural network accelerator, and, as such, may be able to perform the large scale, parallel computations of a neural network more efficiently than when the computations are performed by the processor 102. As another example, the acceleration engine 112 can be a graphics processing unit (GPU), and may be optimized to perform the computations needed for graphics rendering. Other examples of devices that can be implemented by the acceleration engine 112 include cryptographic accelerators, compression and decompression accelerators, 3-D accelerators, regular expression accelerators, security accelerators, and others.

In various examples, the acceleration engine 112 can execute program code to perform certain operations. For example, when the acceleration engine 112 is a neural network accelerator, the acceleration engine 112 can be programmed to execute a particular neural network, such as one that performs image recognition or one that performs machine translation. As a further example, to support the execution of a neural network, the acceleration engine 112 can be programed to perform operations such as copying data for the neural network from processor memory 104 (for example) into the acceleration engine 112, copying input data for the neural network from processor memory 104 into the acceleration engine 112, and/or copying results from the acceleration engine 112 into the processor memory 104, among other examples.

To generate program code for the acceleration engine 112, in various examples, the host system 100 can execute the compiler 130. Compilers, in general, are software programs that translate program code written in a human-readable language into a format (e.g., machine instructions) that can be read and processed by an integrated circuit device. In the example of FIG. 1, the acceleration engine 112 is a neural network accelerator and the compiler 130 is for compiling a neural network description into instructions to be executed by the acceleration engine 112. When the acceleration engine 112 implements a different type of accelerator, another compiler can be used.

The compiler 130 can be activated, for example, when the operating system 120 receives keyboard, mouse, touchscreen, voice commands, or other inputs from the Input/Output devices 108. The inputs can further include parameters for the compiler 130, such as the input code 142 to compile and configuration options for the compilation process. Once the compiler 130 is activated, the processor 102 can load the instructions for the compiler 130 into the processor memory 104, and can execute the instructions.

In the example of FIG. 1, the compiler 130 includes a first stage 132, a second stage 136, and a third stage 140, which each perform different operations to produce compiled code 144. In other examples, the compiler 130 can combine the operations of the first stage 132, second stage 136, and/or third stage 140 into fewer stages, or can divide the operations of one of the stages into multiple stages.

The first stage 132 can receive and process input code 142. The input code 142 can describe a program in a high-level programming language, such as Java, C++, or Tensorflow, among many other examples. The input code 142 can describe, for example, steps to perform image recognition, speech recognition, machine translation, or other operations. The input code 142 can be obtained, for example, from the storage device 106. Alternatively, though not illustrated here, the input code 142 may be located in the processor memory 104 or can be obtained from a network location, using the network interface 110. Processing of the input code 142 can include sorting the operations described in the input code 142 into layers, where the outputs of one layer provide the inputs to a next layer. Processing can also include identifying steps to be performed by the processor 102, rather than by the acceleration engine 112. For example, the processor 102, through the execution of a driver 122, may need to perform steps such as configuring Direct Memory Access (DMA) descriptors for moving data into or out of the acceleration engine 112, among other examples.

The output 134 of the first stage 132 can be organized, for example, in the layers, nodes, and connections between nodes of a neural network. The second stage 136 can perform intermediate processing on this output 134. For example, the operations performed in any one layer, or at any one node in a layer, may be too many for the acceleration engine 112 to perform at the same time. The acceleration engine 112 may, for example, have a limited amount of locale storage space for the data needed for a computation, or the computations may be more than the acceleration engine 112 can perform at one time. In this example, the first stage 132 can break the operations of the layer or node down into smaller operations, which can fit into the acceleration engine's local memory and/or can fit into the computing capacity of the acceleration engine 112. Processing of the output 134 of the first stage 132 can include other steps, such as scheduling, or determining the order in which the acceleration engine 112 and/or processor 102 will perform operations, among other examples.

In various examples, the output 138 of the second stage 136 includes the various steps to be performed by components of the acceleration engine 112, in the order that the steps are to be performed. The output 138 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage 140 can operate on the output 138 of the second stage 136, and perform various steps before producing the instructions that are to be executed by the acceleration engine 112. These steps can include, for example, removing redundant dependencies, resolving or handling dependencies between nodes by inserting synchronization instructions into the code, identifying possibly optimizations in memory usage or memory bandwidth usage, and other operations. In some examples, the third stage 140 can include a data scheduler 150 to determine the order in which instructions are executed by the acceleration engine 112.

The output of the third stage 140 is compiled code 144, which may include machine instructions in binary format. In some examples, the compiled code 144 can be stored in the processor memory 104. Alternatively or additionally, the compiled code 144 can be copied to the storage device 106 or to a network location. As noted above, the acceleration engine 112 may be located at a different host system, in which case the compiled code 144 can be sent over the network interface 110 to the other host system.

In the example of FIG. 1, the host system 100 can be executing a driver 122, which can also be referred to as a device driver or runtime driver, that manages the acceleration engine 112. The driver 122 can provide an interface between applications executing on the host system 100 (or on another host system) and the acceleration engine 112. For example, the driver 122 can provide an Application Program Interface (API) that defines functions for feeding input data to the acceleration engine 112 and defining the operation to perform on the input data. In this and other examples, the driver 122 can configure the acceleration engine 112 to perform the operation. For example, the driver 122 can identify a neural network that the acceleration engine 112 is to execute, as well as the location in the processor memory 104 or on the storage device 106 where the compiled code 144 for the neural network is located. The driver 122 can further load into the acceleration engine 112 or cause the acceleration engine 112 to load the compiled code 144, can load or cause the acceleration engine 112 to load the input data on which the neural network is to operate, and/or can cause the acceleration engine 112 to being executing on the input data. Once the acceleration engine 112 has finished, the acceleration engine 112 can notify the driver 122, and the driver 122 can deliver a result back to the application that requested the result.

Figure 2:
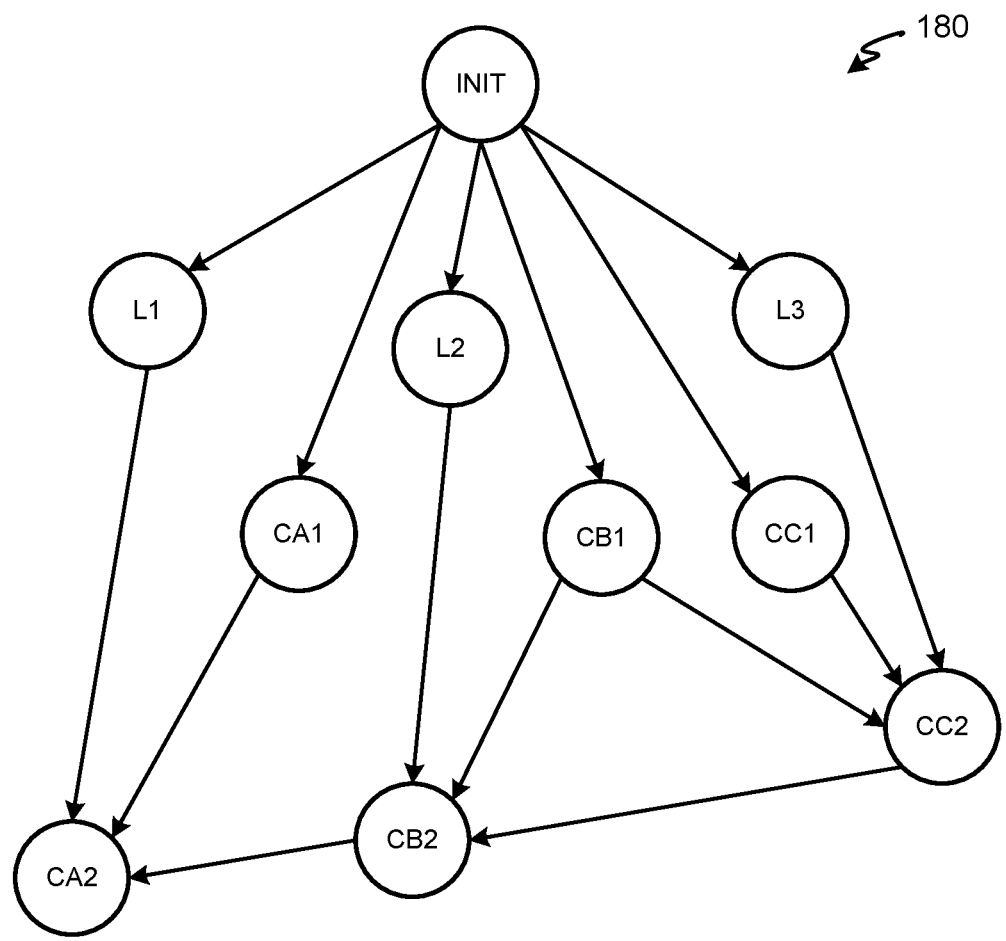
FIG. 2 includes an example of a data flow graph.

FIG. 2 illustrates an example of a data flow graph 180 representing dependencies of instructions to be executed by a computing device such as acceleration engine 112. Data flow graph 180 can be, for example, a directed acyclic graph that has a starting node with no incoming edges (e.g., INIT), and one or more ending nodes with no outgoing edges (e.g., CA2). The computing device on which the instructions of data flow graph 180 are executed may include multiple execution engines. By way of example, the computing device may include three execution engines, which would allow three different computational instructions (one instruction per execution engine) to be executed in parallel. In other implementations, the computing device may include other numbers of execution engines.

The instructions depicted in data flow graph 180 may include load instructions that are executed to retrieve data from memory external to the computing device (e.g., DRAM), and computational instructions that are executed to consume or manipulate data such as arithmetic operations performed on the data. For example, data flow graph 180 may include load instructions L1, L2, and L3 to retrieve data from memory, computational instructions CA1 and CA2 that are executed on a first execution engine CA, computational instructions CB1 and CB2 that are executed on a second execution engine CB, and computational instructions CC1 and CC2 that are executed on a third execution engine CC. The starting instruction INIT can also be a load instruction, but in some implementations, INIT can be a computational instruction. It should be understood that data flow graph 180 as depicted is for illustrative purposes, and that the data flow graph in other implementations may include tens of thousands of instructions or more.

Referring back to FIG. 1, data flow graph 180 can be, for example, the output of the second stage 136 of compiler 130, and scheduler 150 may process data flow graph 180 by scheduling and arranging the execution order of instructions in data flow graph 180. One technique that a scheduler can use to schedule the instructions of data flow graph 180 is to traverse down the graph, and schedule instructions in a linear order at each stage of the graph while preserving the proper data dependency. For example, a scheduler may select the INIT instruction from data flow graph 180 as an initial instruction to be placed in an ordered list of instructions.

The scheduler may then select the next stage of instructions to schedule, which include instructions having INIT as an incoming edge. Referring to data flow graph 180, these instructions include the L1, L2, and L3 load instructions, and the CA1, CB1, and CC1 computational instructions. The scheduler may add these instructions to the ordered list of instructions in that order. This set of instructions do not require any particular sequence, because there are no data dependency between these instructions at this stage. At this point in time, the ordered list of instructions that the scheduler has completed scheduling may include the sequence of instructions {INIT, L1, L2, L3, CA1, CB1, CC1}. It should be noted that although the instructions are presented in a linear order, instructions corresponding to different execution engines can be executed in parallel. Thus, computational instructions CA1, CB1, and CC1, which are intended for different execution engines, can be executed in parallel in the same clock cycle.

The scheduler may then proceed to schedule the next stage of instructions, which include the computational instructions CA2, CB2, and CC2. Referring to data flow graph 180, the data dependency between these instructions require that CC2 be executed before CB2, which in turn should be executed before CA2. As such, the execution order of this next set of instructions should be scheduled as CC2, CB2, and CA2. Accordingly, the ordered list of instructions for data flow graph 180 under this scheduling technique can be represented as the ordered list of instructions {INIT, L1, L2, L3, CA1, CB1, CC1, CC2, CB2, CA2}.

Although executing data flow graph 180 according to this ordered list of instructions may provide the proper functionality because all data dependencies have been preserved, the L3 load instruction which is consumed by the CC2 computational instruction is being executed as the last of the three load instructions L1, L2, and L3. In some implementations, if the L3 load instructions takes longer to complete than execution of the CA1, CB1, and CC1 computational instructions, one or more idle cycles may need to be inserted before the CC2 computational instruction can execute because the CC2 computational instruction requires the data retrieved by the L3 load instruction. Such a situation may occur, for example, if a load instructions requires three clock cycles to complete, while the CA1, CB1, and CC1 computational instructions can be completed in parallel by the three execution engines in one clock cycle. Nevertheless, if the L3 load instruction was executed first, the extra idle cycle can be eliminated to gain better performance throughput.

FIGS. 3-14 illustrate a series of scheduling events performed in accordance with a scheduling technique that can arrange the instructions of data flow graph 180 in the preferred order. The scheduling technique shown in FIGS. 3-14 can be used to speculatively schedule load instructions before their dependent computational instructions are scheduled. Then as the dependent computational instructions are scheduled, the scheduler can reorder the speculatively scheduled load instructions to correspond to the order of the dependent computational instructions.

Figure 3:
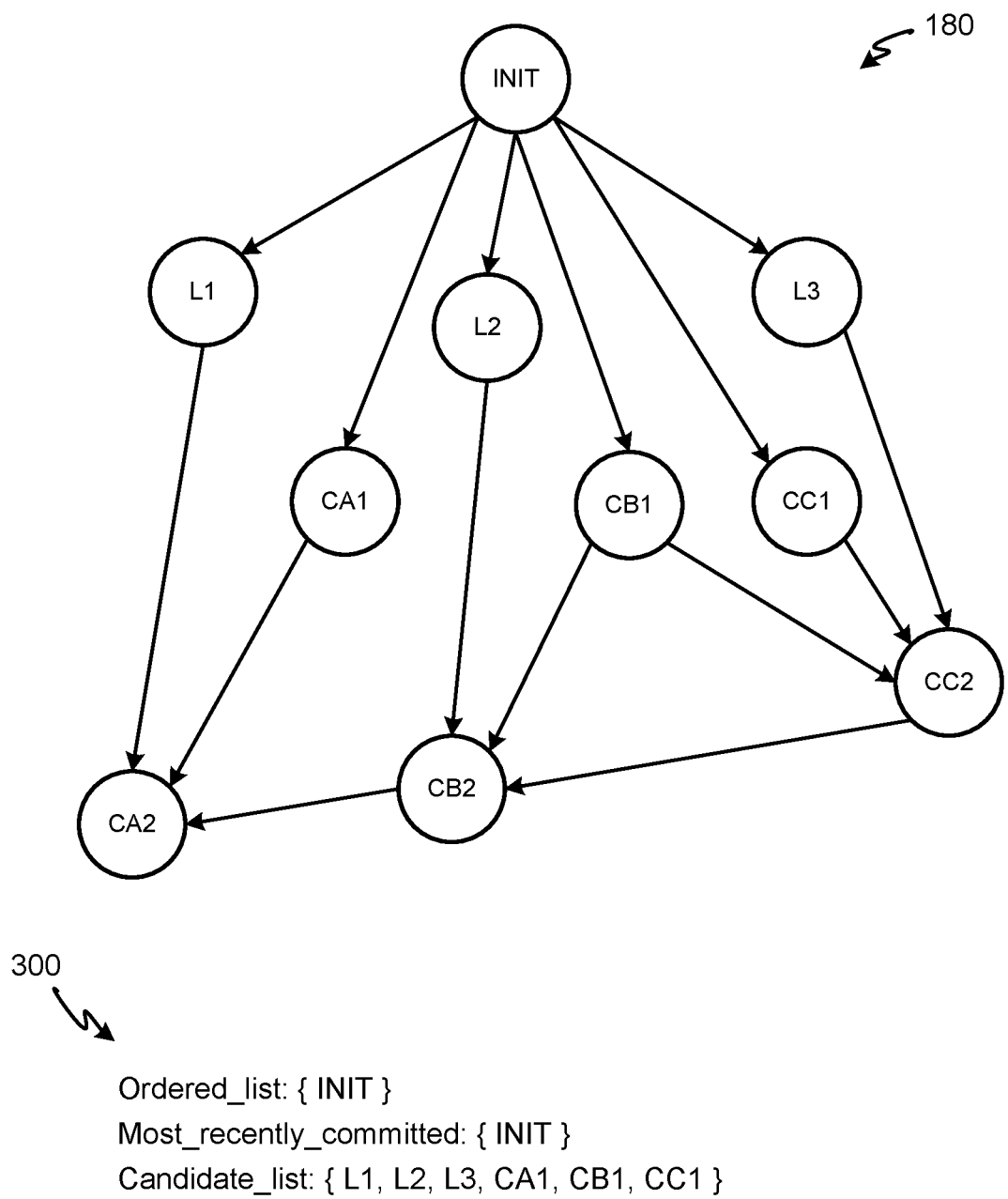
FIGS. 3-14 include examples of updating the data structure maintained by a scheduler during different times of an instruction scheduling process.

Referring to FIG. 3, data flow graph 180 is the same as that shown in FIG. 2 to illustrate the differences between the scheduling techniques. A scheduler may maintain a data structure 300 to facilitate the scheduling process. The scheduler may initially select an instruction from data flow graph 180 as an initial instruction to be placed in an ordered list of instructions. The scheduler may select an instruction that does not have any incoming edges such as the INIT instruction, and schedule the INIT instruction as the first instruction in the order list of instructions as shown. Upon scheduling the INIT instruction, the scheduler also sets this initial instruction as the most recently committed instruction, because at this point in time of the scheduling process, the scheduler has committed the INIT instruction to be the first instruction.

The scheduler can then determine a set of instructions from data flow graph 180 to schedule next, and form a candidate list of instructions. The list of candidate instructions can include instructions whose incoming edge is from the INIT instruction, and may include load instructions and/or computational instructions. Referring to data flow graph 180, the L1, L2, and L3 load instructions, as well as the CA1, CB1, and CC1 computational instructions have their respective incoming edges come from the INIT instruction. As such, the L1, L2, and L3 load instructions, and the CA1, CB1, and CC1 computational instructions are added to the candidate list of instructions to schedule next.

Figure 4:
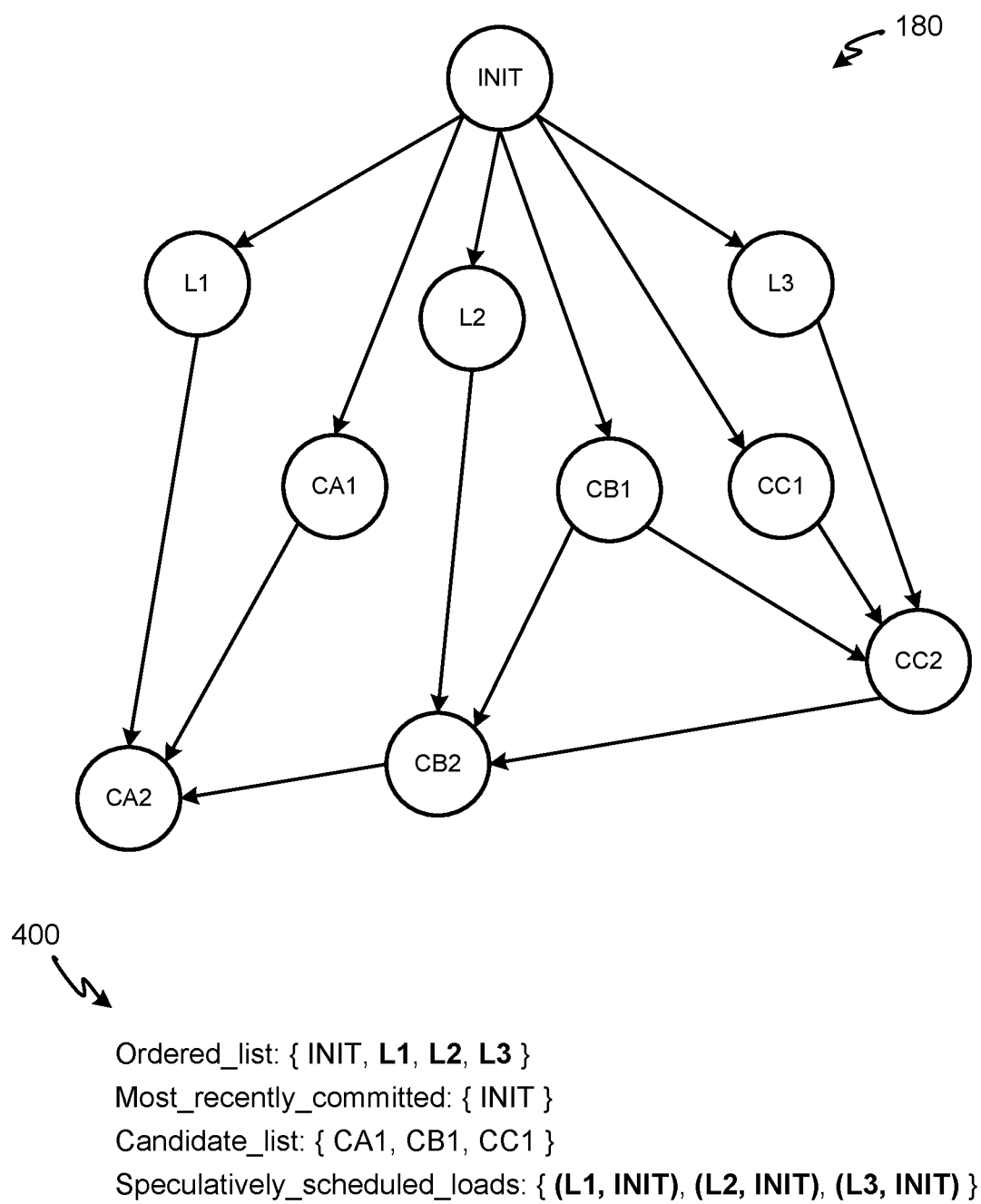

Referring to FIG. 4, the data structure maintained by the scheduler can be updated as data structure 400 during the next phase of the scheduling process. The scheduler can process the candidate list of instructions by speculatively scheduling the load instructions from the candidate list into the ordered list of instructions. The load instructions can be speculatively scheduled in an arbitrary order at this point in time, as the load instructions will be reordered when their dependent computational instructions are scheduled. By way of example, the L1, L2, and L3 load instructions can be speculatively scheduled into the ordered list of instructions in that order, and be removed from the candidate list of instructions. Thus, at this point in time, the ordered list of instructions can be represented as {INIT, L1, L2, L3} where the INIT instruction has been committed, and the L1, L2, and L3 load instructions are speculatively scheduled and subject to reordering.

As the load instructions are being speculatively scheduled, the scheduler can also generate and maintain a list of speculatively scheduled load instructions. The list of speculatively scheduled load instructions can be used to track which load instructions have not been committed yet, and to facilitate the reordering of the load instructions when their dependent computational instructions are scheduled. In some implementations, the list of speculatively scheduled load instructions may contain a set of elements corresponding to the speculatively scheduled load instructions in the ordered list of instructions, and each element may include a speculatively scheduled load instruction paired with the most recently committed instruction. Thus, as shown in the data structure 400 of FIG. 4, the list of speculatively scheduled load instructions can be represented as {(L1, INIT), (L2, INIT), (L3, INIT)}, where each element in the list includes a corresponding speculatively scheduled load instruction paired with the most recently committed instruction, which is the INIT instruction at this point in the scheduling process.

Figure 5:
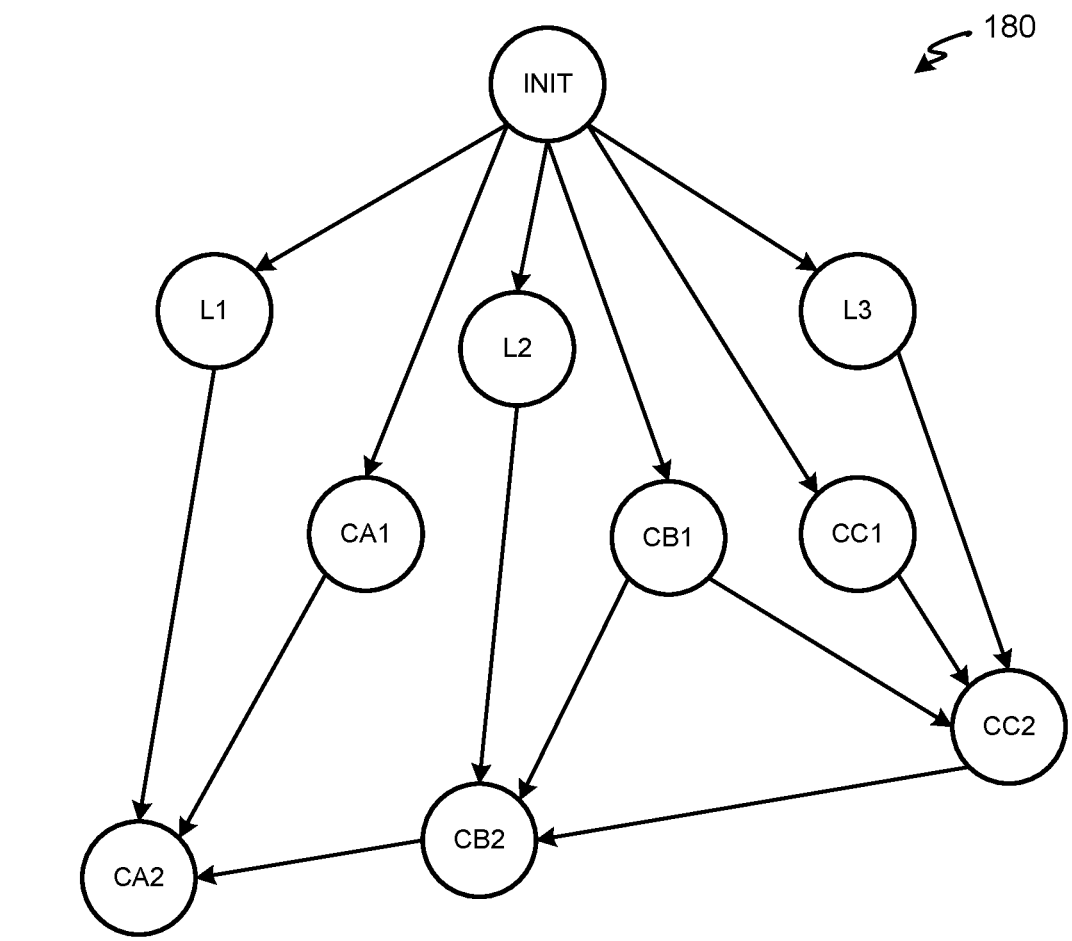

Referring now to FIG. 5, as elements are added to the list of speculatively scheduled load instructions, the scheduler may process each speculatively scheduled load instruction in the list of speculatively scheduled load instructions by determining the computational instruction from data flow graph 180 that depends on the speculatively scheduled load instruction, and add the speculatively scheduled load instruction to a list of load instructions that the computational instruction depends on. With respect to the L1 load instruction, the CA2 computational instruction is the dependent instruction in data flow graph 180, and thus the L1 load instruction is added to CA2's list of load instructions. Similarly, CB2 is the dependent computation instruction of the L2 load instruction, and CC2 is the dependent computational instruction of the L3 load instruction. Accordingly, the L2 load instruction is added to CB2's list of load instructions, and the L3 load instruction is added to CC2's list of load instructions as shown in data structure 500.

Figure 6:
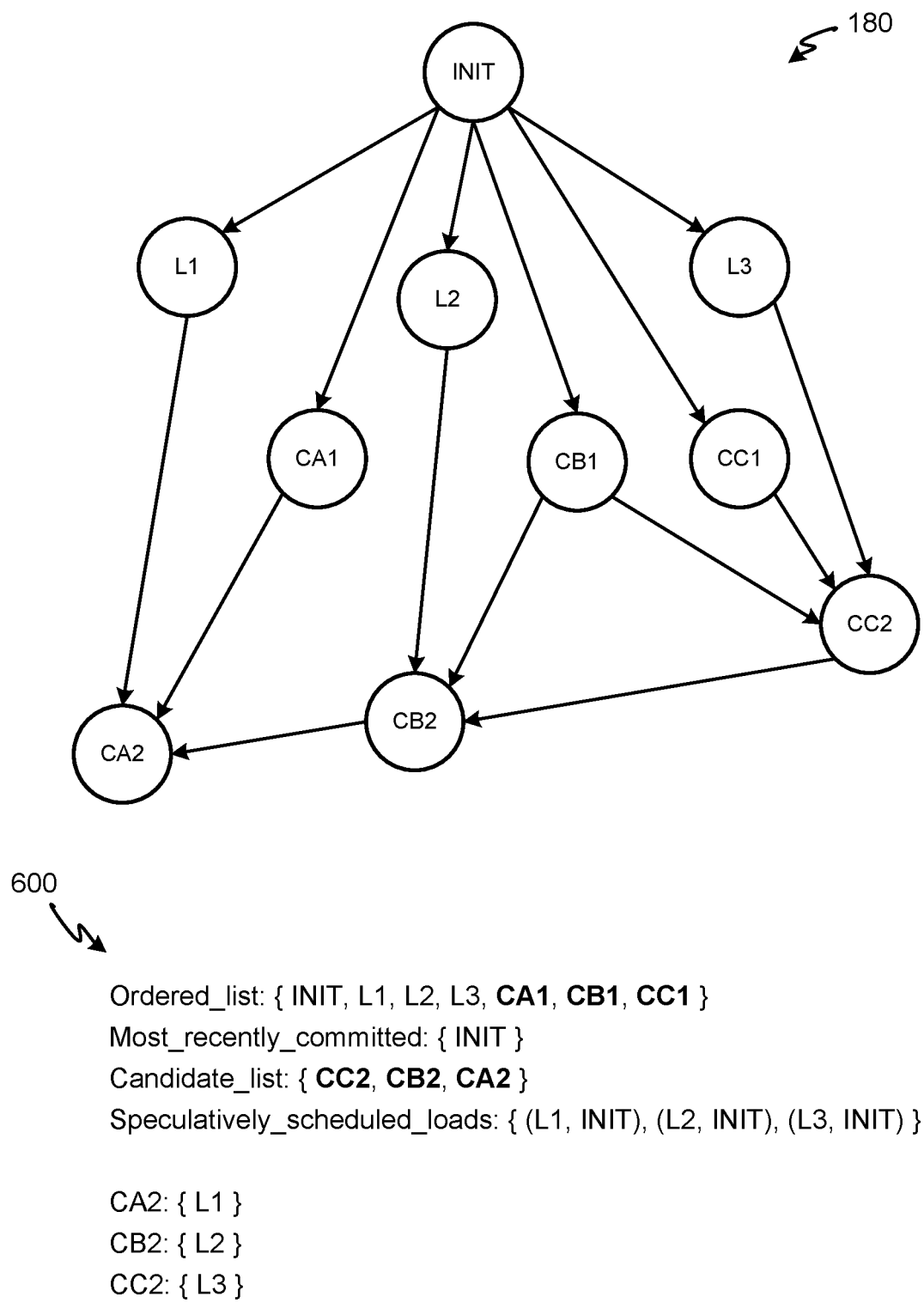

After speculatively scheduling the load instructions from the candidate list, the scheduler can proceed with scheduling the remaining computational instructions on the candidate list, and determine a next set of instructions to add to the candidate list. Referring to FIG. 6, the scheduler can update the data structure 600 by moving the CA1, CB1, and CC1 computational instructions from the candidate list to the ordered list of instructions. As there are no data dependencies between these instructions, they can be scheduled in any arbitrary order. Although these instructions may appear to be in certain order in the ordered list of instructions, these instructions can be executed in parallel because these instructions are intended for different execution engines.

At this point in time, the scheduler also determines a next set of instructions to schedule and add them to the candidate list. The next set of instructions may include instructions whose incoming edges come from the instructions that were previously on the candidate list. Referring to data flow graph 180, the CA2, CB2, and CC2 computational instructions have their respective incoming edges come from an instruction that was previously on the candidate list, and thus these instructions are added to the candidate list to be scheduled next. The latency of these instructions can also be determined at this point. The latency of an instruction can be represented as the number of clock cycles it takes to reach the instruction from the initial instruction, and can be indicated by the longest path to the instruction in the data flow graph. Referring to data flow graph 180, of the three instructions CA2, CB2, and CC2, the CC2 computational instruction has the shortest latency, followed by the CB2 computational instruction, and the CA2 computational instruction. The data dependency of these three instructions also require the CC2 instruction be executed before the CB2 instruction, and that the CB2 instruction be executed before the CA2 instruction. Accordingly, these instructions are arranged in order of increasing latency in the candidate list as {CC2, CB2, CA2}. In some implementations, the computational instructions can be scheduled according to other preferences or priorities. For example, the computational instructions can be scheduled based on the capabilities or computational bandwidth of the execution engines, pipelining order, criticality or importance of the data being operated on, etc.

Figure 7:
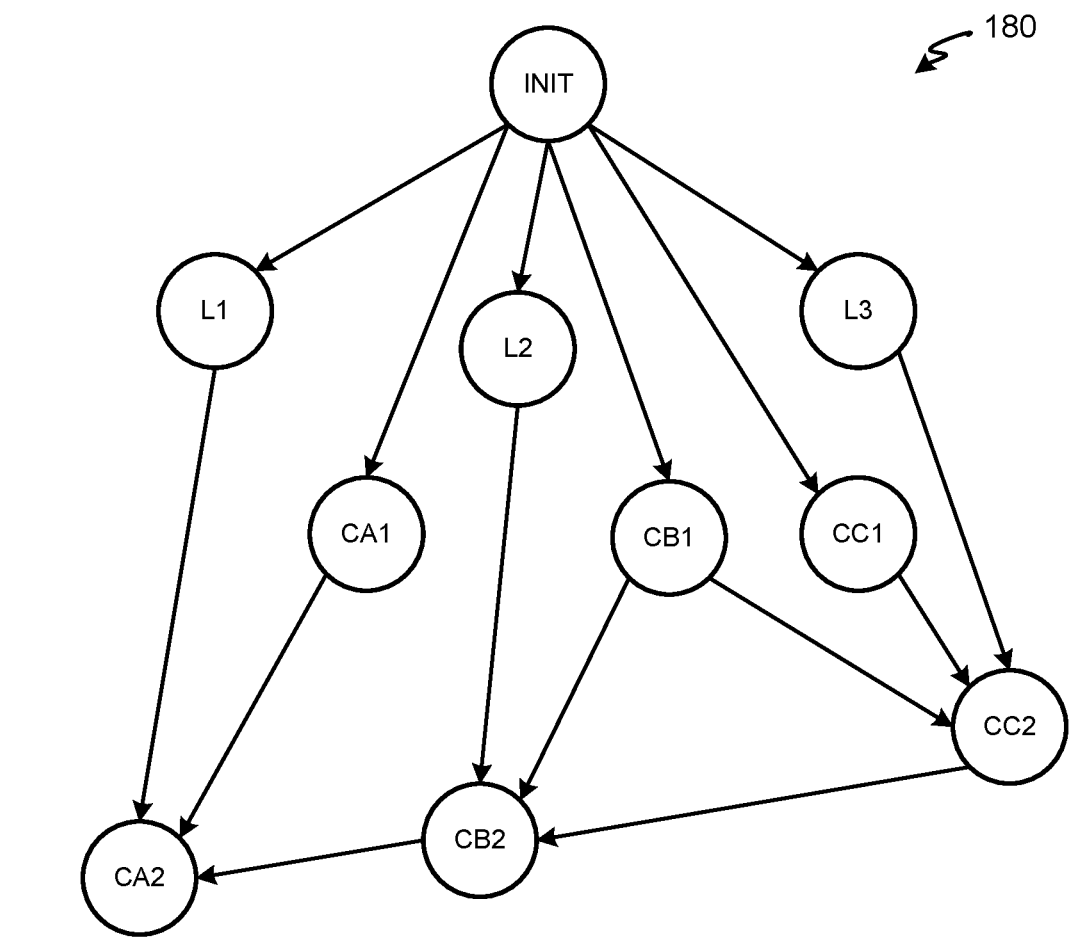

Referring to FIG. 7, the scheduler can then schedule the computational instructions that have been added to the candidate list, which are dependent instructions of the speculatively scheduled load instructions. For example, the computational instructions can be scheduled in the order of increasing latency such that the computational instruction to be executed first is scheduled first. As explained above, the CC2 computational instruction has the shortest latency and thus will be scheduled first. Hence, the CC2 computational instruction is added to the ordered list of instructions and removed from the candidate list.

The scheduler also determines which load instruction in the list of load instructions for the CC2 computational instruction is still remaining in the list of speculatively scheduled load instructions. As shown in data structure 700, the list of load instructions from which the CC2 instruction depends includes the L3 load instruction, which is still on the list of speculatively scheduled load instructions. In other words, at this point in time, the scheduler has not yet committed the L3 load instruction. As part of the process of scheduling the CC2 instruction, the load instructions from which the CC2 instruction depends will be reordered if necessary and be committed by the scheduler. To perform reordering of the L3 load instruction, the scheduler can look up the load instruction in the list of speculatively scheduled load instructions to determine the most recently committed instruction that is paired with the load instruction. Referring to data structure 700, the L3 load instruction is paired with the INIT instruction as the most recently committed instruction.

Figure 8:
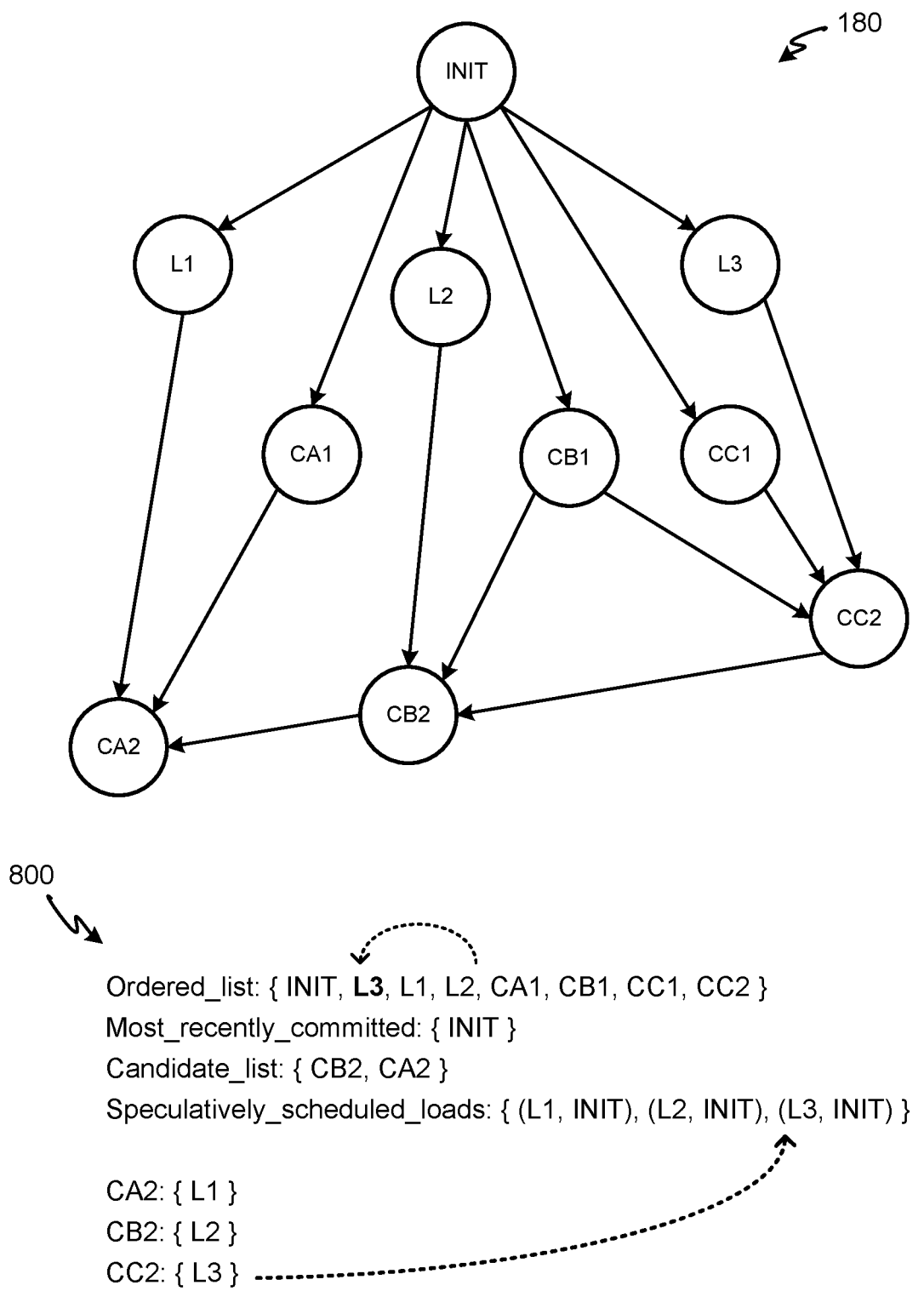
Figure 9:
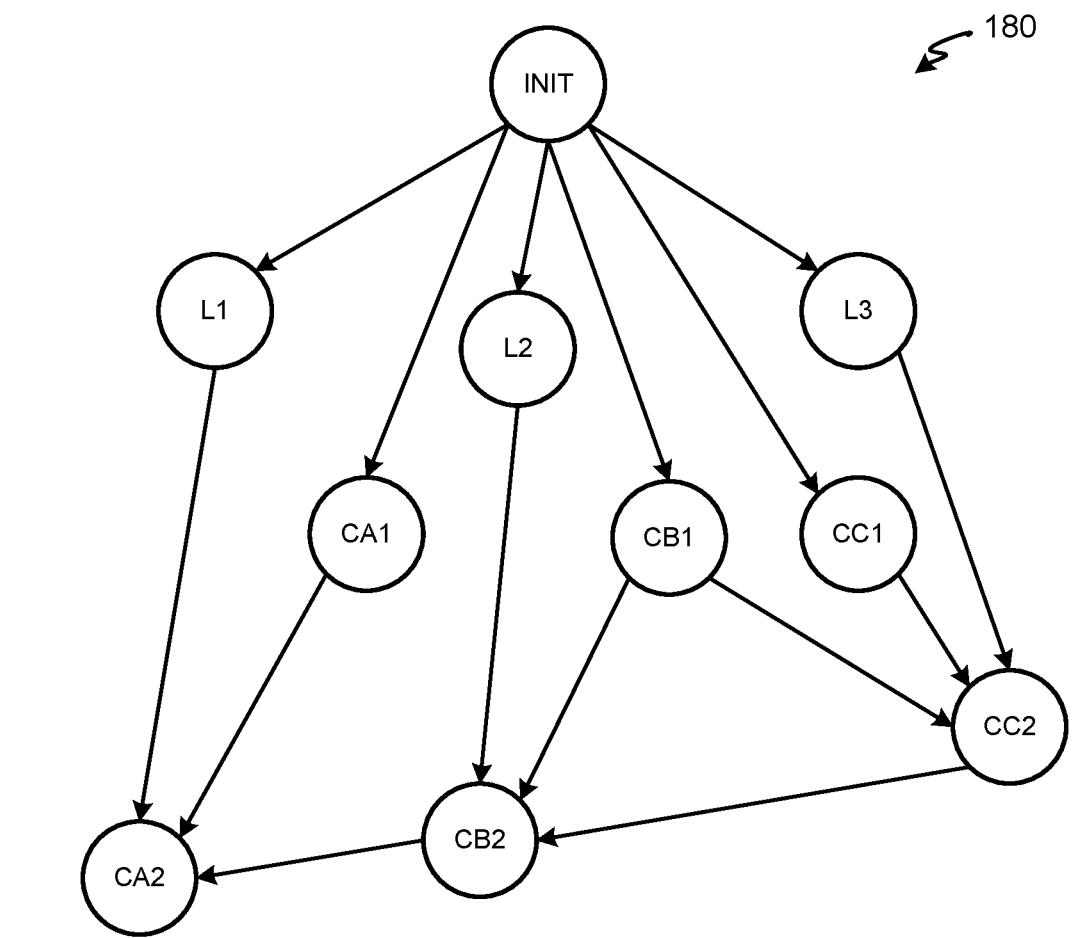

Referring now to FIG. 8 and data structure 800, the speculatively scheduled load instruction being reordered is moved to follow the most recently committed instruction paired with that load instruction as indicated in the list of speculatively scheduled load instructions. Thus, the L3 load instruction is moved up to follow the INIT instruction, which is the most recently committed instruction paired with the L3 instruction in the list of speculatively scheduled load instructions. As shown in FIG. 9 and data structure 900, the reordered load instructions is then committed, and becomes the most recently committed instruction. The scheduler also sets the reordered load instruction as the most recently committed instruction in the remaining elements in the list of speculatively load instructions. Thus, the paring of the L1 and L2 elements in the list of speculatively load instructions has been updated to replace the INIT instruction with the L3 load instruction as the most recently committed instruction. The L3 load instruction can then be removed from the list of speculatively scheduled load instructions. If there are additional load instructions for the CC2 instruction which are still on the list of speculatively scheduled load instructions, those load instructions can be reordered in a similarly manner by looking up the their paring in the list speculatively scheduled load instructions, and moving them to follow their respective paired instruction.

Figure 10:
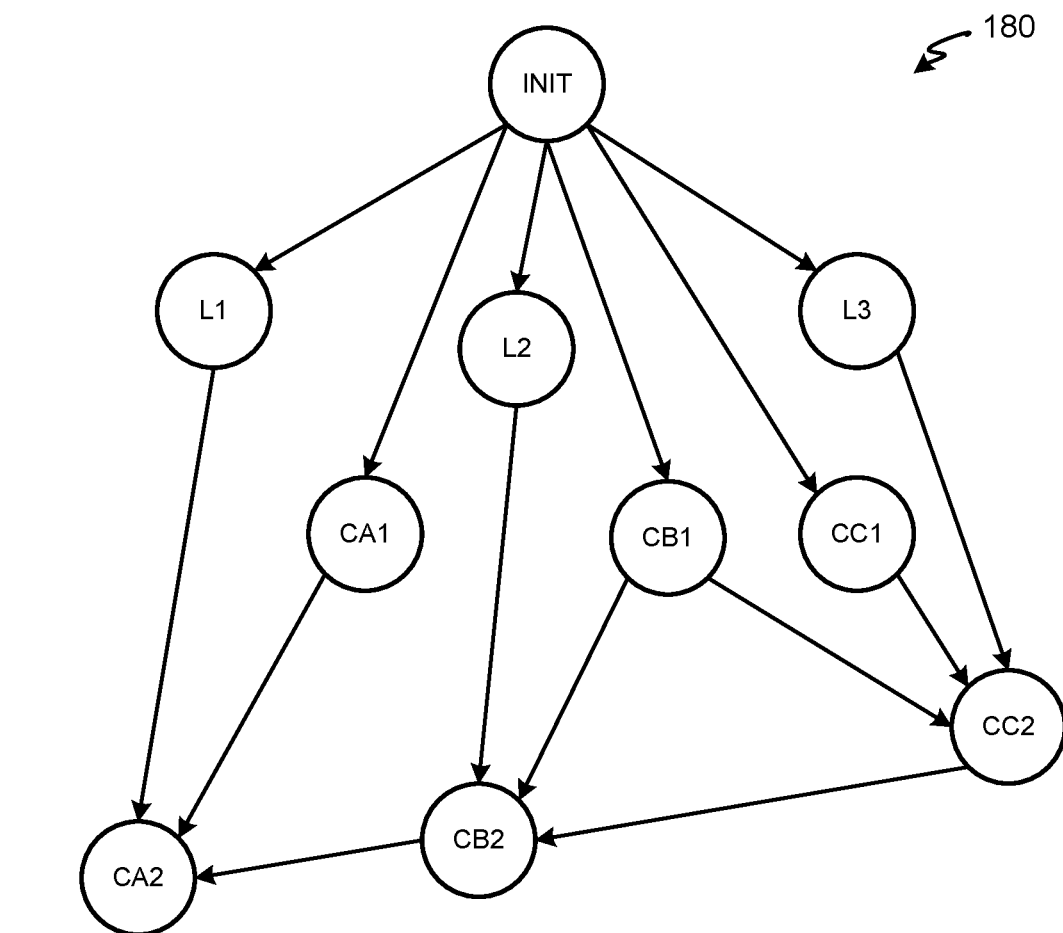
Figure 11:
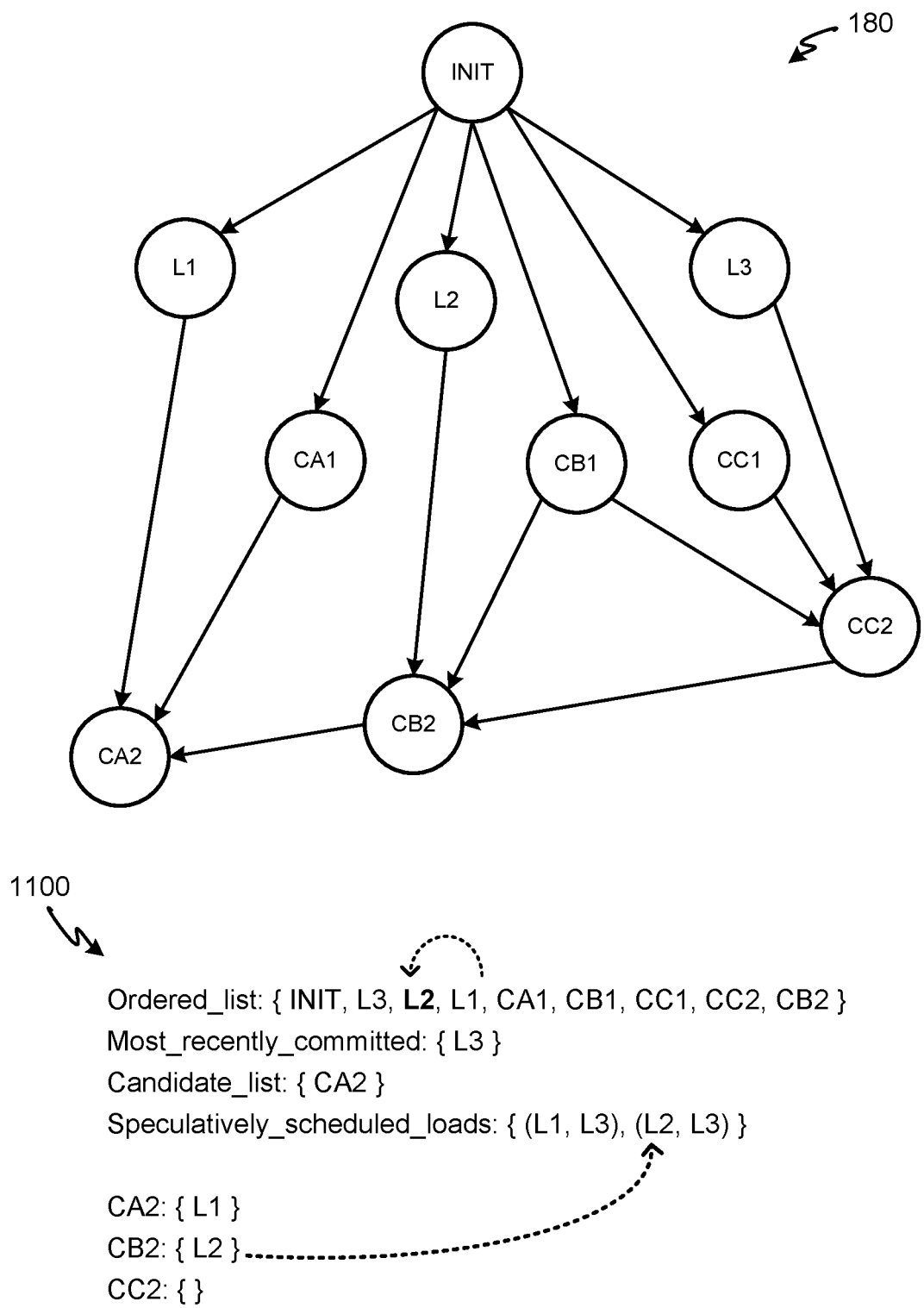
Figure 12:
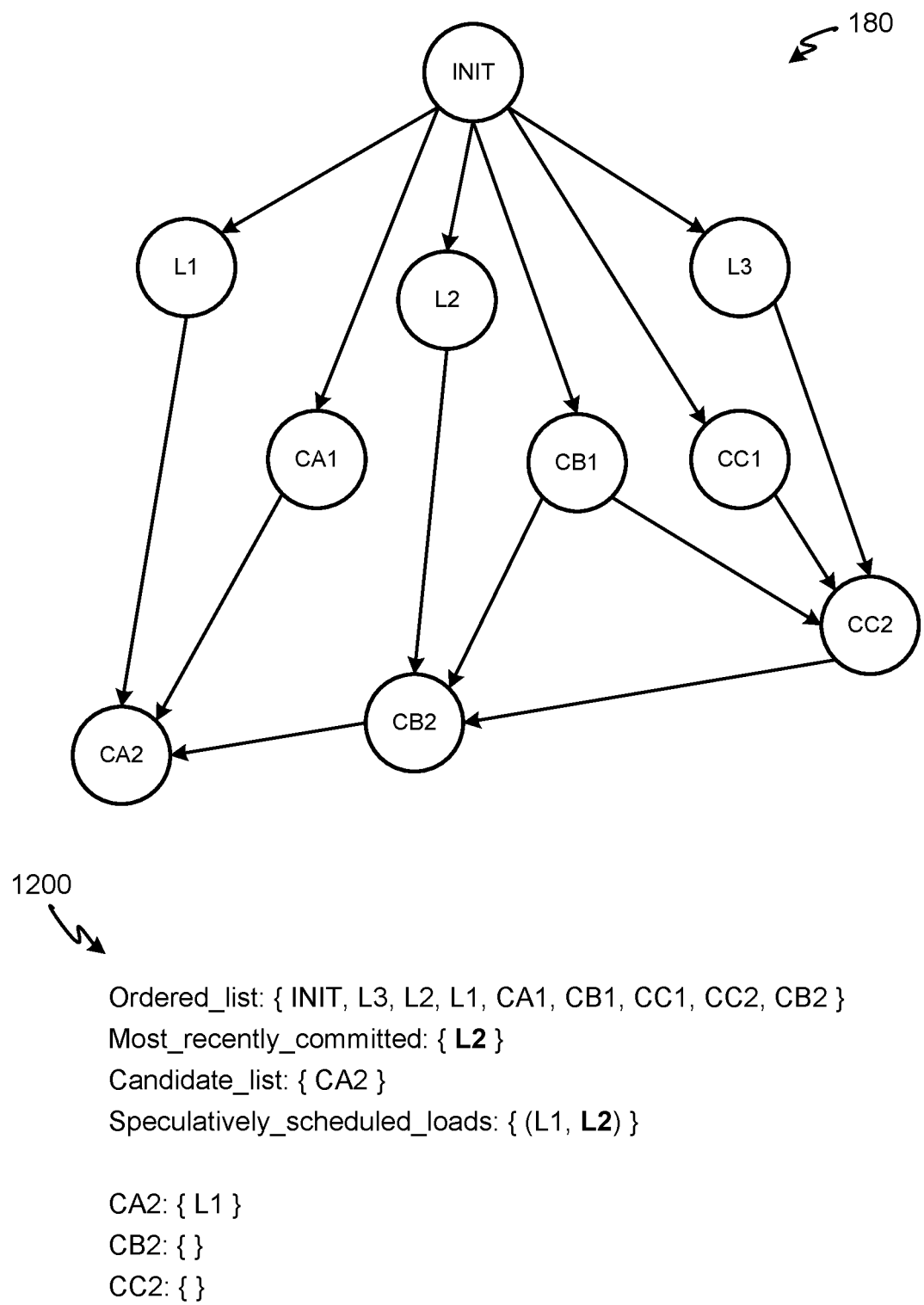

The next instruction on the candidate list to schedule is the CB2 instruction. Referring to FIG. 10 and data structure 1000, the CB2 computational instruction is added to the ordered list of instructions. The scheduler determines which load instruction on the list of load instructions for the CB2 instruction is still remaining on the list of speculatively scheduled load instructions. As shown in FIG. 10, the L2 load instruction is still on the list of speculatively scheduled load instructions, and thus the L2 load instruction will be reordered if necessary in the ordered list of instructions. Referring to FIG. 11, the L2 load instruction is paired with the L3 load instruction as the most recently committed instruction in the list of speculatively scheduled load instructions. Thus, the L2 load instruction is moved up to follow the L3 load instruction in the ordered list of instructions as shown in data structure 1100. Then in FIG. 12, the L2 load instruction is committed, and the remaining elements in the list of speculatively scheduled load instruction is updated to replace the most recently committed instruction with the L2 load instruction. If there are additional load instructions for the CB2 instruction that are still remaining in the list of speculatively scheduled load instructions, those load instructions can be reordered in a similarly manner.

Figure 13:
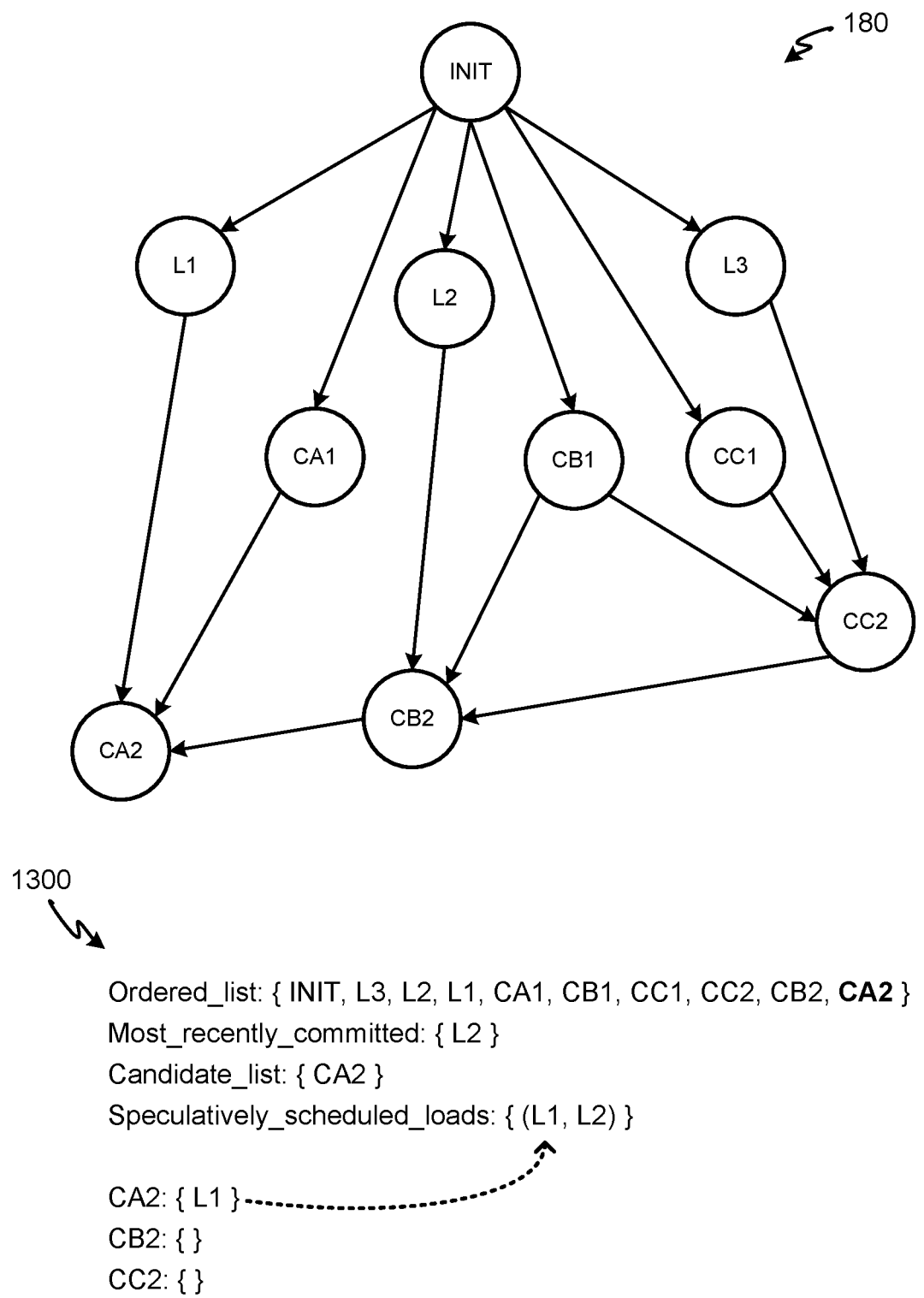

The next instruction on the candidate list to schedule is the CA2 instruction. Referring to FIG. 13 and data structure 1300, the CA2 computational instruction is added to the ordered list of instructions. The scheduler determines which load instruction on the list of load instructions for the CA2 instruction is still remaining on the list of speculatively scheduled load instructions. As shown in data structure 1300, the L1 load instruction is still on the list of speculatively scheduled load instructions, and thus the L1 load instruction will be reordered if necessary in the ordered list of instructions. The L1 load instruction is paired with the L2 load instruction as the most recently committed instruction in the list of speculatively scheduled load instructions. Thus, the L1 load instruction should follow the L2 load instruction in the ordered list of instructions. Because the L1 load instruction already follows the L2 load instruction in the ordered list of instructions, no reordering of the L1 load instruction is necessary. Next, in FIG. 14, the L1 load instruction is committed, and is set as the most recently committed instruction. If there are additional load instructions for the CA2 instruction which are still on the list of speculatively scheduled load instructions, those load instructions can be reordered in a similarly manner.

At this point in time, all instructions in data flow graph 180 has been scheduled. The computational instructions that come after the load instructions can be committed, and the ordered list of instructions can be used to generate compiled code for execution on a computing device. It should be understood that if additional stages and instructions are present in the data flow graph, the scheduling technique described above can be repeated for each stage of instructions in the data flow graph.

Figure 14:
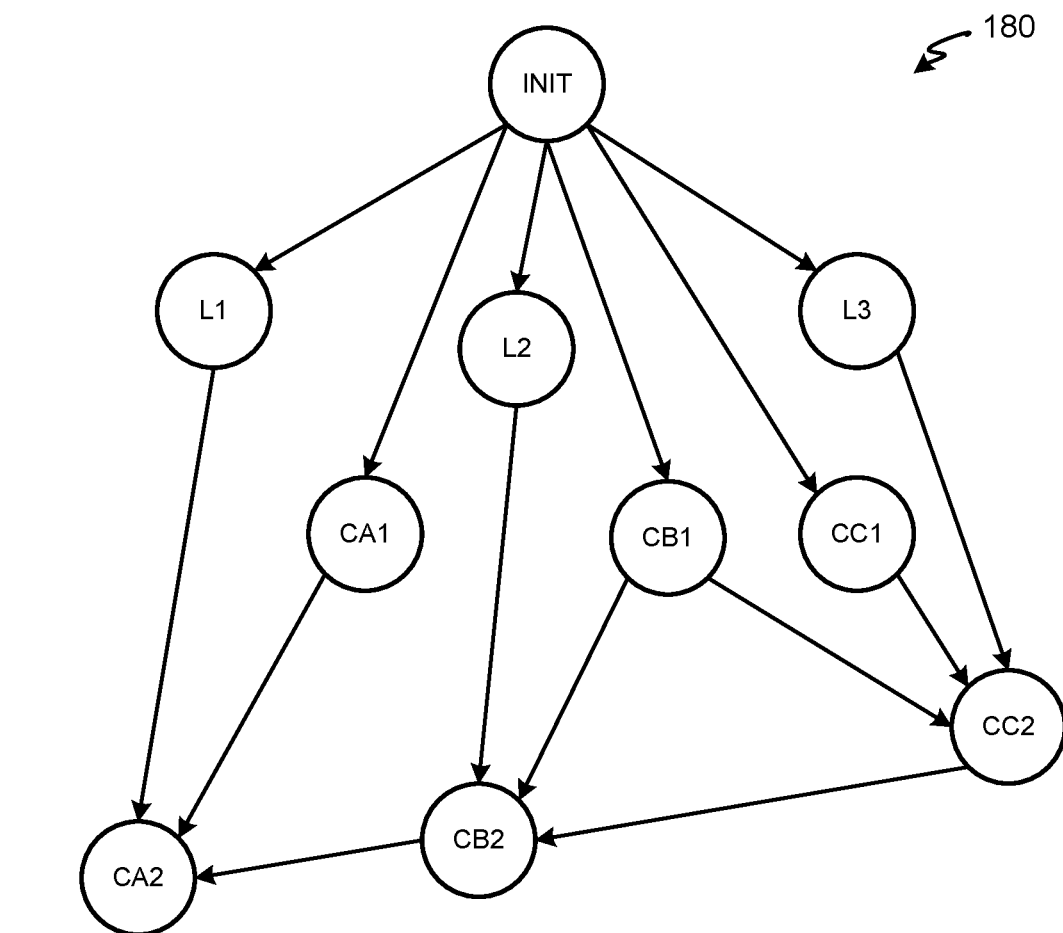

As shown in FIG. 14, the final sequence of instructions in the ordered list of instructions can be represented as {INIT, L3, L2, L1, CA1, CB1. CC1, CC2, CB2, CA2}. In contrast to the sequenced scheduled in FIG. 2, the load instructions L3, L2, and L1 are arranged in the same order as their dependent computational instructions CC2, CB2, can CA2. This can reduce and eliminate the number of idle cycles that may otherwise be needed to ensure the data required by a computational instruction has been obtained from the external memory. It should also be noted that maintaining the list of all loads that a computational instruction depends on allows the erasure of all the load instructions associated with the computational instruction from the list of speculatively scheduled load instructions when the computation instruction is scheduled. This can prevent the list of speculatively scheduled load instructions from growing too large, and allows for a more efficient scheduling process, especially in the context of neural networks which may involve tens of thousands of instructions or more.

Figure 15:
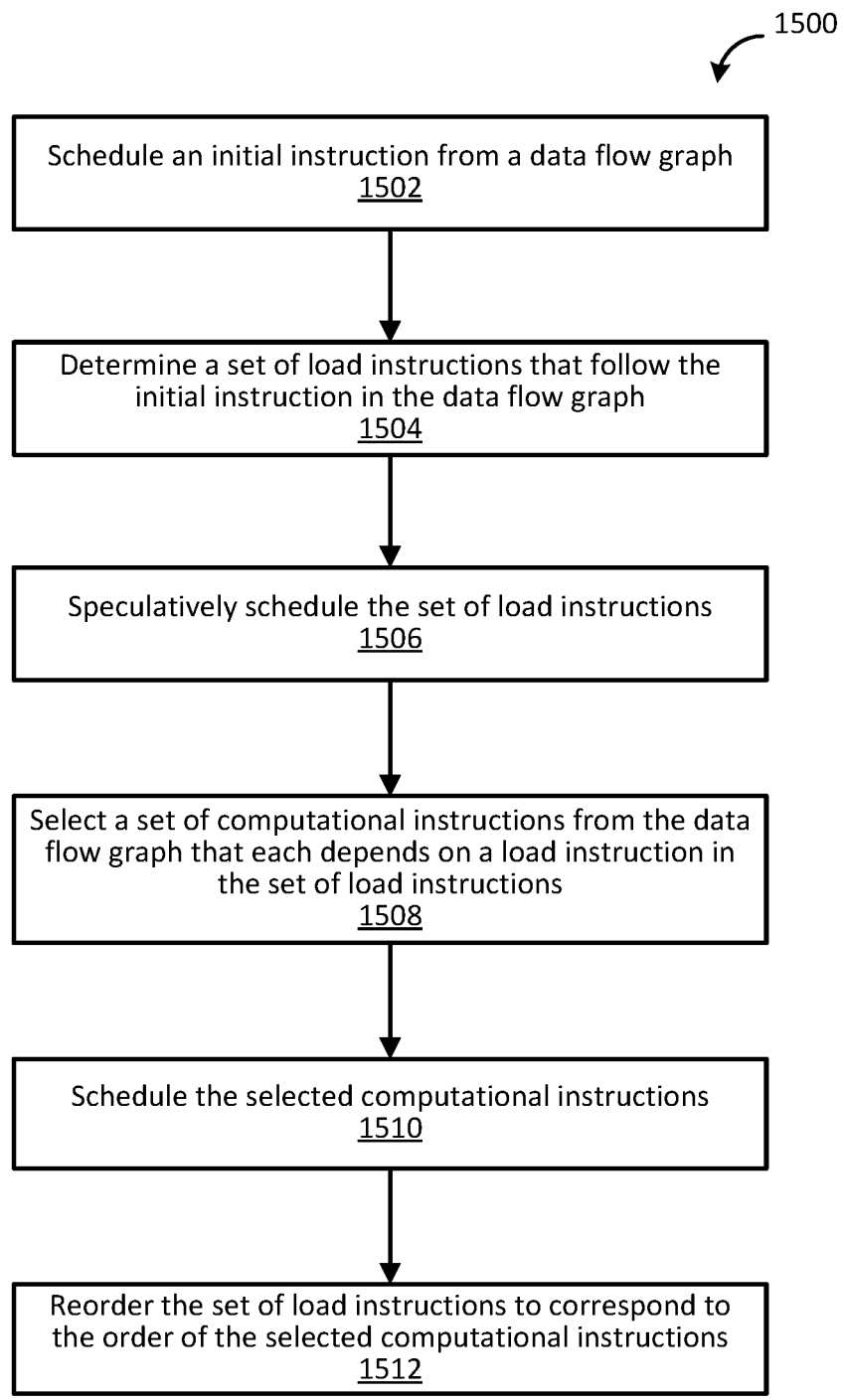
FIG. 15 includes a flow chart of an example of an instruction scheduling process.

FIG. 15 includes a flowchart illustrating an example of a process 1500 for scheduling instructions to be executed on a computing device. These methods may be implemented by the systems described above, such as for example scheduler 150 of compiler 130 in host system 100. In some implementations, process 1500 can be embodied in a computer readable medium. Process 1500 can be used to efficiently schedule load instructions in an order that corresponds to their dependent computational instructions. By ordering the load instructions in such a sequence, the amount of idle time that a computational instruction may need to obtain the data required by the computational instruction can be reduced At block 1502, process 1500 may begin by scheduling an initial instruction from a data flow graph representing a computer program. The computer program can be, for example, a neural network model, and can be executed on a computing device having multiple execution engines. Examples of execution engines that can be used to implement a neural network model may include a pooling engine, an activation engine, and a processing element array. The initial instruction can be an instruction in the data flow graph that does not have any incoming edges.

At block 1504, a set of load instructions that follow the initial instruction is determined from the data flow graph. The set of load instructions may include load instructions having an incoming edge that comes from the initial instruction in the data flow graph. In some implementations, the set of load instructions determined at block 1504 can be added to a list of candidate instructions to schedule next. The list of candidate instructions may also include computational instructions having an incoming edge that comes from the initial instruction in the data flow graph.

At block 1506, the set of load instructions determined at block 1504 can be speculatively scheduled. The set of load instructions can be speculatively scheduled in any order, as the ordering of these load instructions are subject to change when their dependent computational instructions are scheduled. A list of speculatively scheduled load instructions can be generated and maintained to facilitate the reordering of the speculatively scheduled load instructions. For example, each element in the list of speculatively scheduled load instructions can include a speculatively scheduled load instruction paired with a most recently committed instruction, which is updated during the scheduling process. In some implementations, if the candidate list of instructions also include computational instructions having an incoming edge come from the initial instruction, these computational instructions can be scheduled after the load instructions.

At block 1508, a set of computational instructions from the data flow graph that each depends on a load instruction in the set of load instructions is selected. In other words, for each of the load instructions in the set of load instructions that were speculatively scheduled in block 1506, the dependent of that load instruction is identified. For each of the selected computational instructions, a list of load instructions that each of the selected computational instruction depends on is generated and maintained. The latency of each of the selected computational instructions can also be determined.

At block 1510, the selected computational instructions from block 1508 are scheduled. For example, the selected computation instructions can be scheduled in order of increasing latency. In some implementations, the computational instructions can be scheduled according to other preferences or priorities. For example, the computational instructions can be scheduled based on the capabilities or computational bandwidth of the execution engines, pipelining order, criticality or importance of the data being operated on, etc. As the selected computational instructions are scheduled, the set of load instructions that were speculatively scheduled in block 1506 are reordered at block 1512 to correspond to the same order as that of the selected computational instructions. The reordering process of the set of load instructions may include processing each of the selected computational instructions sequentially in the following manner. For each load instruction in the list of load instructions that the selected computational instruction depends on, the load instruction is scheduled to follow the most recently committed instruction paired with the load instruction, and the scheduled load instruction is set as the most recently committed instruction in remaining elements of the list of speculatively scheduled load instructions. As the load instructions in the list of speculatively scheduled load instructions are scheduled and committed, the committed load instruction can be removed from the list of speculatively scheduled load instructions.

Figure 16A:
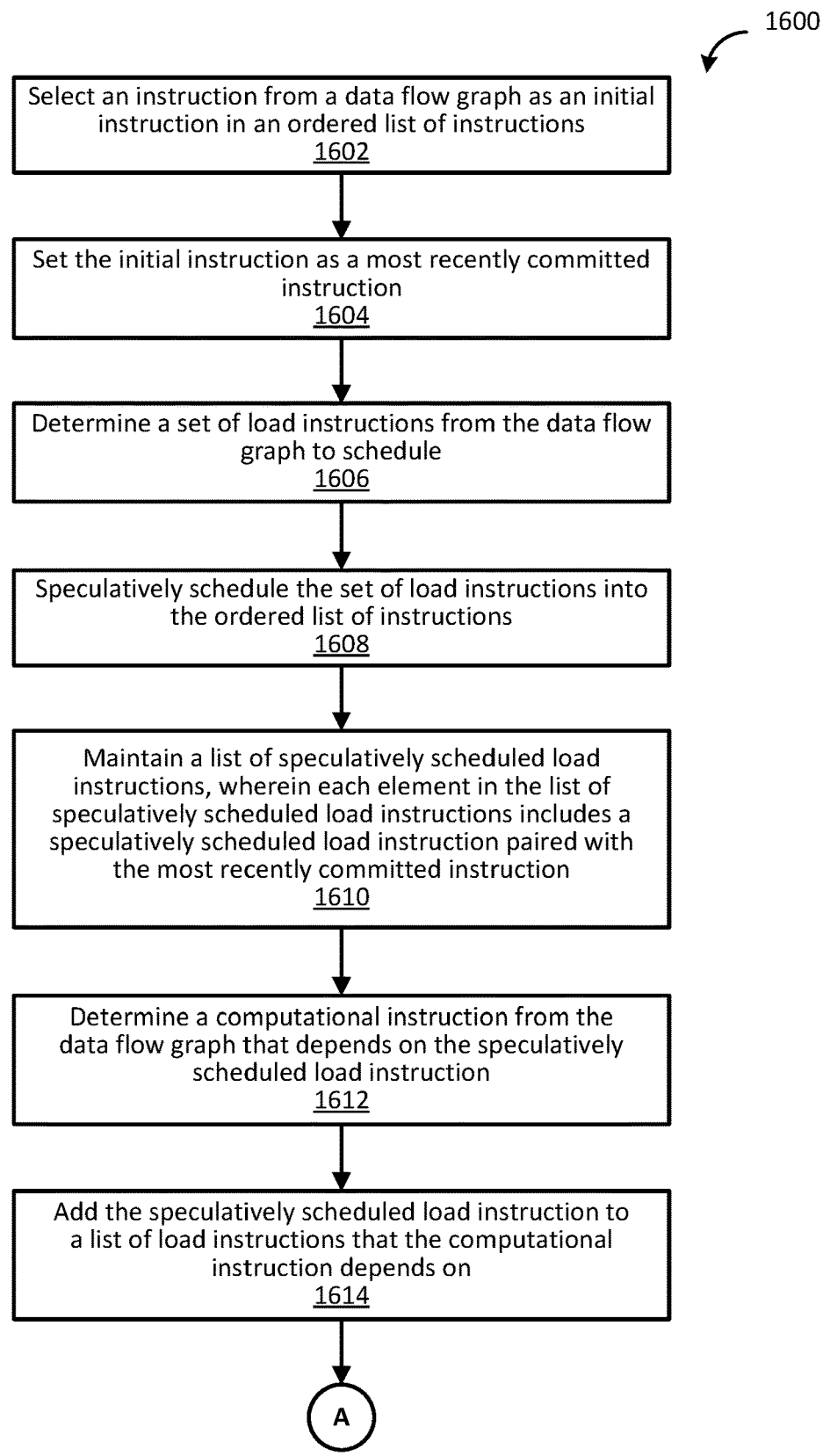
FIGS. 16A-16B include a flow chart of another example of an instruction scheduling process.
Figure 16B:
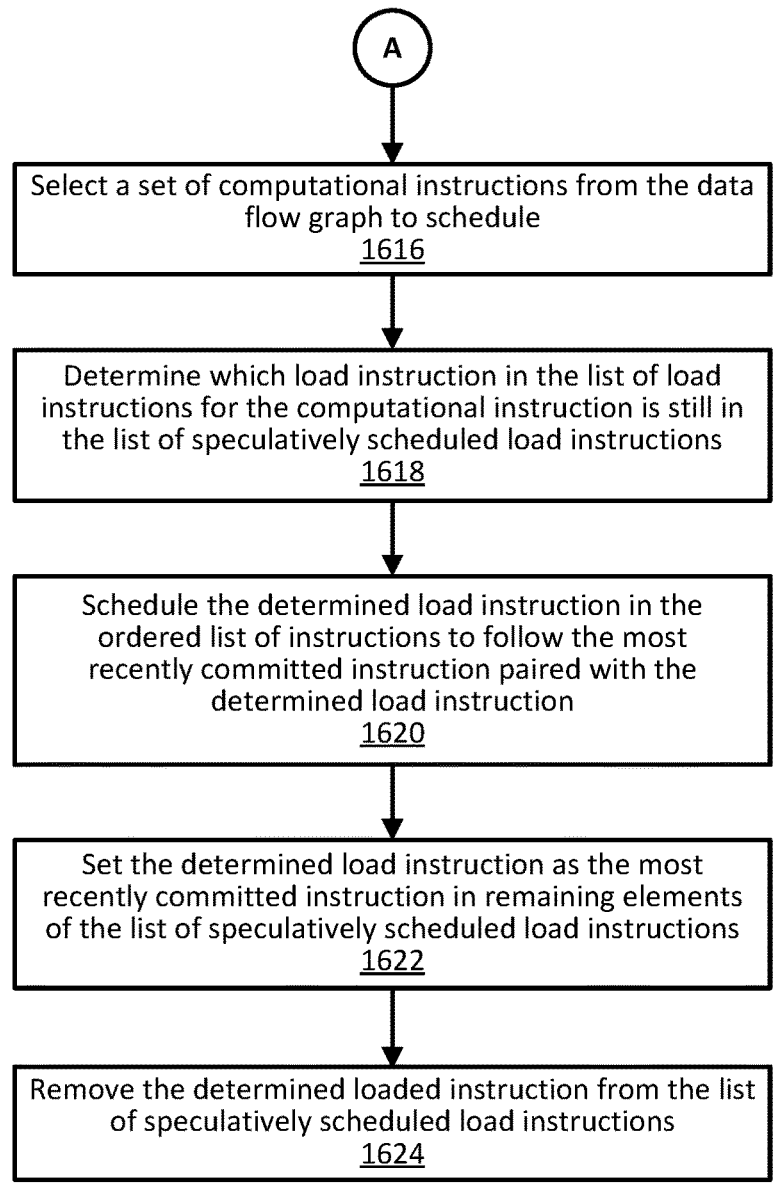

FIGS. 16A-B include a flowchart illustrating a more detailed example of a process 1600 for scheduling instructions to be executed on a computing device. The steps in process 1600 can be used, for example, to implement some or all of the steps in process 1500.

Referring to FIG. 16A, at block 1602, an instruction is selected from a data flow graph as an initial instruction in an ordered list of instructions. As discussed above, the initial instruction being selected can be an instruction that does not have any incoming edges in the data flow graph. At block 1604, the initial instruction can be set as a most recently committed instruction, and the initial instruction is committed to be the first instruction in the ordered list of instructions.

At block 1606, a set of load instructions is determined from the data flow graph to schedule. The set of load instructions may include instructions that have an incoming edge that comes from the initial instruction, and can be added to a candidate list of instructions to schedule. At block 1608, the set of load instructions is speculatively scheduled into the ordered list of instructions. The load instructions that have been speculatively scheduled can be removed from the candidate list. At block 1610, a list of speculatively scheduled load instructions is maintained, where each element in the list of speculatively scheduled load instructions includes a speculatively scheduled load instruction paired with the most recently committed instruction.

Process 1600 may then process each speculatively scheduled load instruction in the list of speculatively scheduled load instructions in accordance with blocks 1612 and 1614. At block 1612, a computational instruction from the data flow graph that depends on the speculatively scheduled load instruction is determined. For example, a computational instruction can be determined as being dependent on the speculatively scheduled load instruction if an outgoing edge of the speculatively scheduled load instruction points to the computational instruction. At block 1614, the speculatively scheduled load instruction is added to a list of load instructions that the computational instruction depends on. Thus, each of the dependent computational instruction is associated with a list of load instructions that may be required by the dependent computational instruction.

Referring next to FIG. 16B, at block 1616, a set of computational instructions is selected from the data flow graph to schedule next. The set of computational instructions selected at block 1616 can include instructions having an incoming edge that comes from a speculatively scheduled load instruction. Process 1600 may then process each of the selected computational instructions in accordance with blocks 1618-1624. In some implementations, the selected computation instructions can be processed in order of increasing latency of the selected computational instructions. In other words, a computational instruction that is executed first will be processed first in accordance with blocks 1618-1624. In some implementations, the computational instructions can be processed according to other preferences or priorities.

At block 1618, a determination is made as to which load instruction in the list of load instructions for the selected computational instruction is still in the list of speculatively scheduled load instructions. In some implementations, a load instruction may no longer be in the list of speculatively scheduled load instruction if a prior instruction also depends on the load instruction, and the load instruction was committed and removed from the list when scheduling that prior instruction. Then, for each determined load instruction that is still on the list of speculatively scheduled load instructions, at block 1620, the determined load instruction is scheduled in the ordered list of instructions to follow the most recently committed instruction that is paired with the determined load instruction. At block 1622, the determined load instruction is set as the most recently committed instruction in remaining elements of the list of speculatively scheduled load instructions. At block 1624, the determined loaded instruction is removed from the list of speculatively scheduled load instructions.

Although certain aspects of the scheduling techniques have been described with reference to scheduling instructions for a neural network, the techniques described herein can also be used to optimize the ordering of load instructions for other types of computing applications such as instructions for a processor, instructions for other types of accelerators such as graphic processing units, network processors, etc.

Figure 17:
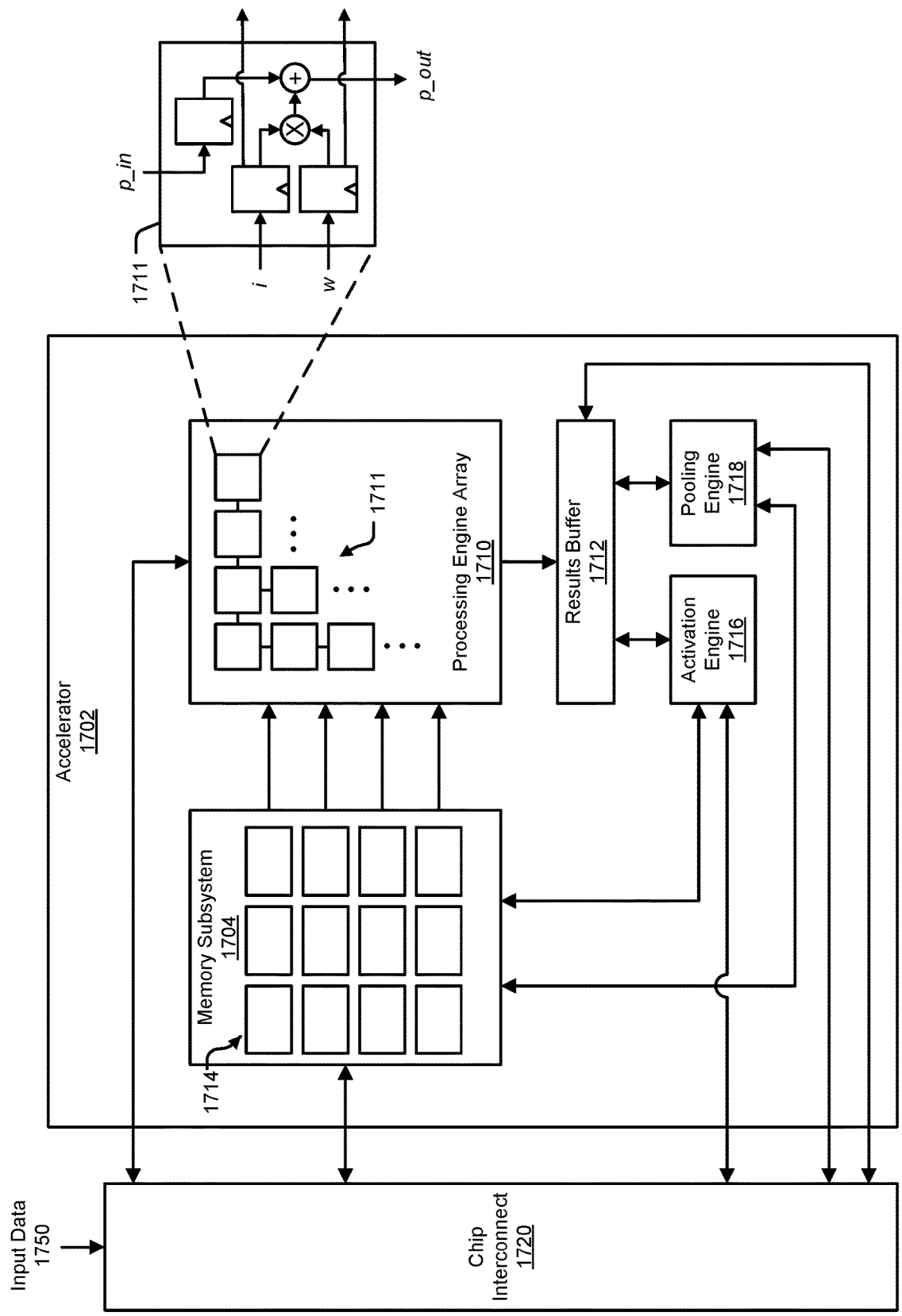
FIG. 17 includes a block diagram illustrating an example of an integrated circuit device.

FIG. 17 is a block diagram illustrating an example of an integrated circuit device that can include an accelerator 1702. In various examples, the accelerator 1702, for a set of input data (e.g., input data 1750), can execute computations using a processing engine array 1710, an activation engine 1716, and/or a pooling engine 1718. In some examples, the example accelerator 1702 may be an integrated circuit component of a processor, such as a neural network processor. The processor may have other integrated circuit components, including additional accelerator engines.

In various implementations, the memory subsystem 1704 can include multiple memory banks 1714. In these implementations, each memory bank 1714 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 1714. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 1704 can permit simultaneous access to the read or write channels of multiple memory banks. As another example, the memory subsystem 1704 can include arbitration logic such that arbitration between, for example, the outputs of multiple memory banks 1714 can result in more than one memory bank's output being used. In these and other examples, though globally managed by the memory subsystem 1704, each memory bank can be operated independently of any other.

Having the memory banks 1714 be independently accessible can increase the efficiency of the accelerator 1702. For example, values can be simultaneously read and provided to each row of the processing engine array 1710, so that the entire processing engine array 1710 can be in use in one clock cycle. As another example, the memory banks 1714 can be read at the same time that results computed by the processing engine array 1710 are written to the memory subsystem 1704. In contrast, a single memory may be able to service only one read or write at a time. With a single memory, multiple clock cycles can be required, for example, to read input data for each row of the processing engine array 1710 before the processing engine array 1710 can be started.

In various implementations, the memory subsystem 1704 can be configured to simultaneously service multiple clients, including the processing engine array 1710, the activation engine 1716, the pooling engine 1718, and any external clients that access the memory subsystem 1704 over a communication fabric 1720. In some implementations, being able to service multiple clients can mean that the memory subsystem 1704 has at least as many memory banks as there are clients. In some cases, each row of the processing engine array 1710 can count as a separate client. In some cases, each column of the processing engine array 1710 can output a result, such that each column can count as a separate write client. In some cases, output from the processing engine array 1710 can be written into the memory banks 1714 that can then subsequently provide input data for the processing engine array 1710. As another example, the activation engine 1716 and the pooling engine 1718 can include multiple execution channels, each of which can be separate memory clients. The memory banks 1714 can be implemented, for example, using static random access memory (SRAM).

In various implementations, the memory subsystem 1704 can include control logic. The control logic can, for example, keep track of the address spaces of each of the memory banks 1714, identify memory banks 1714 to read from or write to, and/or move data between the memory banks 1714. In some implementations, memory banks 1714 can be hardwired to particular clients. For example, a set of memory banks 1714 can be hardwired to provide values to the rows of the processing engine array 1710, with one memory bank servicing each row. As another example, a set of memory banks can be hard wired to receive values from columns of the processing engine array 1710, with one memory bank receiving data for each column.

The processing engine array 1710 is the computation matrix of the example accelerator 1702. The processing engine array 1710 can, for example, execute parallel integration, convolution, correlation, and/or matrix multiplication, among other things. The processing engine array 1710 includes multiple processing engines 1711, arranged in rows and columns, such that results output by one processing engine 1711 can be input directly into another processing engine 1711. Processing engines 1711 that are not on the outside edges of the processing engine array 1710 thus can receive data to operate on from other processing engines 1711, rather than from the memory subsystem 1704.

In various examples, the processing engine array 1710 uses systolic execution, in which data arrives at each processing engine 1711 from different directions at regular intervals. In some examples, input data can flow into the processing engine array 1710 from the left and weight values can be loaded at the top. In some examples weights and input data can flow from the left and partial sums can flow from top to bottom. In these and other examples, a multiply-and-accumulate operation moves through the processing engine array 1710 as a diagonal wave front, with data moving to the right and down across the array. Control signals can be input at the left at the same time as weights, and can flow across and down along with the computation.

In various implementations, the number of columns in the processing engine array 1710 determines the computational capacity of the processing engine array 1710, and the number of rows determines the required memory bandwidth for achieving maximum utilization of the processing engine array 1710. The processing engine array 1710 can have, for example, 64 columns and 428 rows, or some other number of columns and rows.

An example of a processing engine 1711 is illustrated in FIG. 17 in an inset diagram. As illustrated by this example, a processing engine 1711 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 1711.

In the illustrated example, an input from above can include a partial sum, pin, provided either from another processing engine 1711 or from a previous round of computation by the processing engine array 1710. When starting a computation for a new set of input data, the top row of the processing engine array 1710 can receive a fixed value for p_in, such as zero. As illustrated by this example, i and w are multiplied together and the result is summed with p_in to produce a new partial sum, p_out, which can be input into another processing engine 1711. Various other implementations of the processing engine 1711 are possible.

Outputs from the last row in the processing engine array 1710 can be temporarily stored in the results buffer 1712. The results can be intermediate results, which can be written to the memory banks 1714 to be provided to the processing engine array 1710 for additional computation. Alternatively, the results can be final results, which, once written to the memory banks 1714 can be read from the memory subsystem 1704 over the communication fabric 1720, to be output by the system.

In some implementations, the accelerator 1702 includes an activation engine 1716. In these implementations, the activation engine 1716 can combine the results from the processing engine array 1710 into one or more output activations. For example, for a convolutional neural network, convolutions from multiple channels can be summed to produce an output activation for a single channel. In other examples, accumulating results from one or more columns in the processing engine array 1710 may be needed to produce an output activation for a single node in the neural network. In some examples, activation engine 1716 can be bypassed.

In various examples, the activation engine 1716 can include multiple separate execution channels. In these examples, the execution channels can correspond to the columns of the processing engine array 1710, and can perform an operation on the outputs of a column, the result of which can be stored in the memory subsystem 1704. In these examples, the activation engine 1716 may be able to perform between 1 and n parallel computations, where n is equal to the number of columns in the processing engine array 1710. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 1702 can include a pooling engine 1718. Pooling is the combining of outputs of the columns of the processing engine array 1710. Combining can include for example, computing a maximum value, a minimum value, an average value, a median value, a summation, a multiplication, or another logical or mathematical combination. In various examples, the pooling engine 1718 can include multiple execution channels that can operating on values from corresponding columns of the processing engine array 1710. In these examples, the pooling engine 1718 may be able to perform between 1 and n parallel computations, where n is equal to the number of columns in the processing engine array 1710. In various examples, execution channels of the pooling engine 1718 can operate in parallel and/or simultaneously. In some examples, the pooling engine 1718 can be bypassed.

Herein, the activation engine 1716 and the pooling engine 1718 may be referred to collectively as execution engines. The processing engine array 1710 is another example of an execution engine. Another example of an execution engine is a Direct Memory Access (DMA) engine, which may be located outside the accelerator 1702.

Input data 1750 can arrive over the communication fabric 1720. The communication fabric 1720 can connect the accelerator 1702 to other components of a processor, such as a DMA engine that can obtain input data 1750 from an Input/Output (I/O) device, a storage drive, or a network interface. The input data 1750 can be, for example one-dimensional data, such as a character string or numerical sequence, or two-dimensional data, such as an array of pixel values for an image or frequency and amplitude values over time for an audio signal. In some examples, the input data 1750 can be three-dimensional, as may be the case with, for example, the situational information used by a self-driving car or virtual reality data. In some implementations, the memory subsystem 1704 can include a separate buffer for the input data 1750. In some implementations, the input data 1750 can be stored in the memory banks 1714 when the accelerator 1702 receives the input data 1750.

In some examples, the accelerator 1702 can implement a neural network processing engine. In these examples, the accelerator 1702, for a set of input data 1750, can execute a neural network to perform a task for which the neural network was trained. Executing a neural network on a set of input data can be referred to as inference or performing inference.

The weights for the neural network can be stored in the memory subsystem 1704, along with input data 1750 on which the neural network will operate. The neural network can also include instructions, which can program the processing engine array 1710 to perform various computations on the weights and the input data. The instructions can also be stored in the memory subsystem 1704, in the memory banks 1714 or in a separate instruction buffer. The processing engine array 1710 can output intermediate results, which represent the outputs of individual layers of the neural network. In some cases, the activation engine 1716 and/or pooling engine 1718 may be enabled for computations called for by certain layers of the neural network. The accelerator 1702 can store the intermediate results in the memory subsystem 1704 for inputting into the processing engine array 1710 to compute results for the next layer of the neural network. The processing engine array 1710 can further output final results from a last layer of the neural network. The final results can be stored in the memory subsystem 1704 and then be copied out to host processor memory or to another location.

Figure 18:
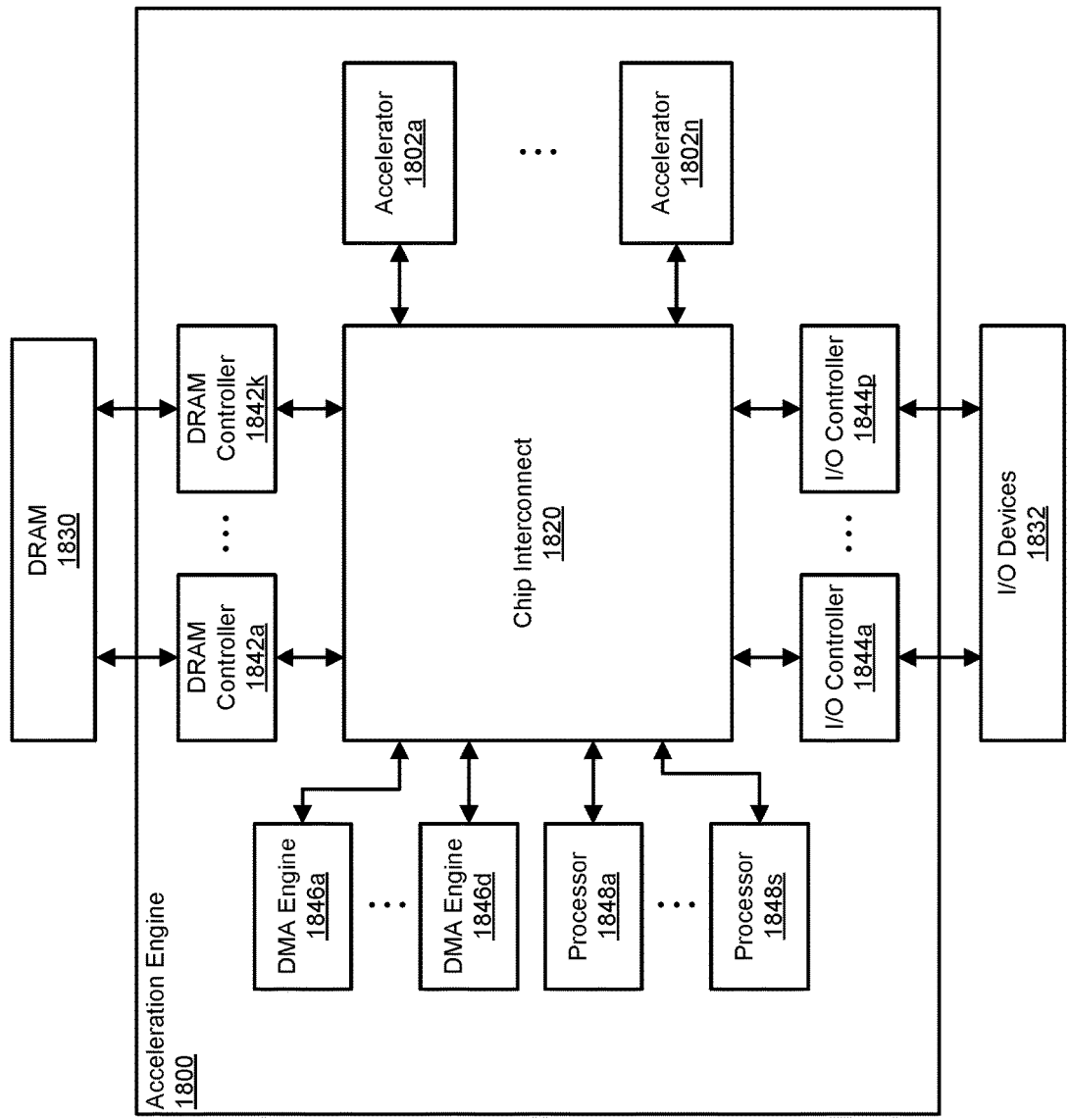
FIG. 18 includes a block diagram that illustrates an example of an acceleration engine.

FIG. 18 includes a block diagram that illustrates an example of an acceleration engine 1800. The acceleration engine 1800 is an example of an integrated circuit that can include one or more accelerators 1802a-1802n that may be similar to the accelerator illustrated in FIG. 17.

In the example of FIG. 18, the acceleration engine 1800 includes multiple accelerators 1802a-1802n, each of which can perform a set of operations. In various examples, the accelerators 1802a-1802n are for particular types of operations, so that the accelerators 1802a-1802n can perform the operations much faster than when similar operations are performed by a general purpose processor. In various examples, to perform a set of operations, input data on which the operations are to be performed must first be moved into the accelerators 1802a-1802n. Additionally, in some cases, program code is also moved into the accelerators 1802a-1802n, which programs the operations that the accelerators 1802a-1802n will perform on the data. In the illustrated example, the acceleration engine 1800 includes n accelerators 1802a-1802n. Examples of accelerators that can be included in the acceleration engine 1800 include graphics accelerators, floating point accelerators, neural network accelerators, and others. In various examples, the accelerators 1802a-1802n can each be the same (e.g., each of the is a graphics accelerator) or can be different (e.g., the accelerators 1802a-1802n include a graphics accelerator, a floating point accelerator, and neural network accelerator).

The example acceleration engine 1800 further includes DRAM controllers 1842a-1842k for communicating with an external memory. The external memory is implemented, in this example, using DRAM 1830. In the illustrated example, the acceleration engine 1800 includes k DRAM controllers 1842a-1842k, each of which may be able to communicate with an independent set of banks of DRAM. In other examples, other types of RAM technology can be used for the external memory. The DRAM controllers 1842a-1842k can also be referred to as memory controllers.

In various examples, input data and/or program code for the accelerators 1802a-1802n can be stored in the DRAM 1830. Different programs can cause the accelerators 1802a-1802n to perform different operations. For example, when one of the accelerators is a neural network accelerator, one program can configure the neural network accelerator to perform speech recognition while another program can configure the neural network accelerator to perform image recognition. In various examples, different accelerators 1802a-1802n can be programmed with different programs, so that each performs a different set of operations. In various examples, the processors 1848a-1848s can manage moving of program code from the DRAM 1830 to the accelerators 1802a-1802n.

The example acceleration engine 1800 further includes I/O controllers 1844a-1844p for communicating with I/O devices 1832 in the system. The acceleration engine 1800 can communicate with I/O devices over, for example, a processor bus. In some examples, the processor bus can be implemented using Peripheral Component Interconnect (PCI) and/or a variation of the PCI bus protocol. The processor bus can connect the acceleration engine 1800 to I/O devices such as, for example, input and output devices, memory controllers, storage devices, and/or network interface cards, among other things. In some examples, the I/O controllers 1844-1844p can enable the acceleration engine 1800 to act as an I/O device for a host processor. For example, the acceleration engine 1800 can be the recipient of input data from the host processor, and a command indicating an operation to be performed on the input data (e.g., a particular computation or analysis). In the illustrated example, the acceleration engine 1800 includes p I/O controllers 1844a-1844p, each of which may include a separate root complex and may communicate with a separate set of I/O devices 1832. In other examples, other standardized bus protocols, such as Ultra Path Interconnect (UPI) can be used for the host bus. In other examples, a proprietary bus protocol can be used.

Movement of data in the acceleration engine 1800 can be managed by one or more processors 1848a-1848s, which can also be referred to as data management processors. In the example of FIG. 18, the acceleration engine 1800 includes s processors 1848a-1848s incorporated into the device (e.g., on the same silicon die). In other examples, the processors 1848a-1848s can be external to the acceleration engine 1800 (e.g., on a different die and/or in a different package). In some examples, the processors 1848a-1848s can manage the movement of data from I/O devices 1832 to the accelerators 1802a-1802n or the DRAM 1830. For example, input data may be located at an I/O device 1832 or in processor memory, and the processors 1848a-1848s can move the input from the I/O device 1832 or processor memory into an accelerator or into DRAM 1830. As another example, program code for the accelerators 1802a-1802n may be located on an I/O device 1832 or in processor memory.

The example acceleration engine 1800 further includes DMA engines 1846a-1846d that can move data between the accelerators 1802a-1802n, DRAM controllers 1842a-1842k, and I/O controllers 1844a-1844p. In the illustrated example, the acceleration engine 1800 includes d DMA engines 1846a-1846d. In some implementations, the DMA engines 1846a-1846d can be assigned to specific tasks, such as moving data from the DRAM controllers 1842a-1842d to the accelerators 1802a-1802n, or moving data between the I/O controllers 1844a-1844p and the accelerators 1802a-1802n. These tasks can be assigned, for example, by enqueueing descriptors with the DMA engines 1846a-1846d, where a descriptor identifies an address for a block of data and an operation (e.g., a read or a write) to perform. A descriptor, for example, can direct a DMA engine to instruct a DMA controller to read a block of data from DRAM 1830. A descriptor can, as a further example, instruct the DMA engine to write data, read by the DMA controller, to an accelerator. Further descriptors can be used to move data from an accelerator to DRAM 1830.

In various examples, each of the processors 1848a-1848s can be responsible for managing the data movement for a different accelerator. In some examples, a processor may manage the data movement for more than one accelerator. Similarly, in various examples, each of the processors 1848a-1848s can be assigned to one or more DMA engines 1846a-1846d. In these and other examples, associations between processors 1848a-1848s, accelerators 1802a-1802n, and DMA engines 1846a-1846d are determined by program code being executed by each respective processor.

In the example acceleration engine 1800, the various components can communicate over a chip interconnect 1820. The chip interconnect 1820 primarily includes wiring for routing data between the components of the acceleration engine 1800. In some cases, the chip interconnect 1820 can include a minimal amount of logic, such as multiplexors to control the direction of data, flip-flops for handling clock domain crossings, and timing logic.

Figure 19:
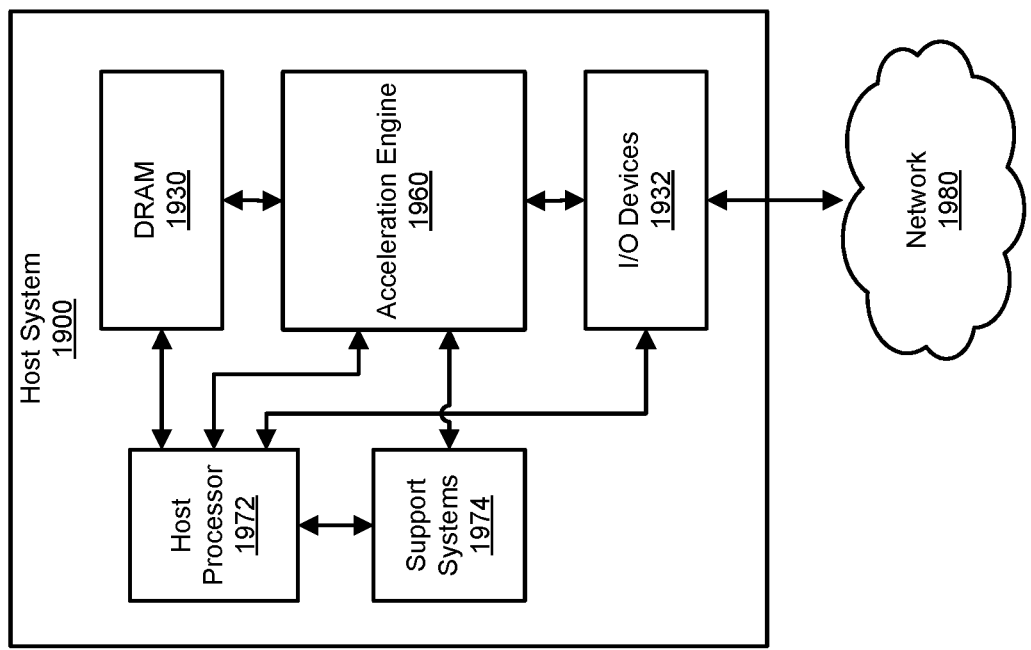
FIG. 19 includes a block diagram that illustrates an example of a host system.

FIG. 19 includes a block diagram that illustrates an example of a host system 1900 in which an acceleration engine 1960 can be used. The acceleration engine 1960 of FIG. 19 is an example of a device that can include one or more accelerators such as is illustrated in FIG. 18. The example host system 1900 of FIG. 19 includes the acceleration engine 1960, a host processor 1972, DRAM 1930 or processor memory, I/O devices 1932, and support systems 1974. In various implementations, the host system 1900 can include other hardware that is not illustrated here.

The host processor 1972 is a general purpose integrated circuit that is capable of executing program instructions. In some examples, the host processor 1972 can include multiple processing cores. A multi-core processor may include multiple processing units within the same processor. In some examples, the host system 1900 can include more than one host processor 1972. In some examples, the host processor 1972 and the acceleration engine 1960 can be one chip, such as, one or more integrated circuits within the same package.

In various examples, the host processor 1972 can communicate with other components in the host system 1900 over one or more communication channels. For example, the host system 1900 can include a host processor bus, which the host processor 1972 can use to communicate with the DRAM 1930, for example. As another example, the host system 1900 can include an I/O bus, such as a PCI-based bus, over which the host processor 1972 can communicate with the acceleration engine 1960 and/or the I/O devices 1932, for example. In various examples, the host system 1900 can, alternatively or additionally, include other communication channels or busses, such as serial busses, power management busses, storage device busses, and so on.

In some examples, software programs executing on the host processor 1972 can receive or generate input for processing by the acceleration engine 1960. In some examples, the programs can select an appropriate neural network to execute for a given input. For example, a program may be for language translation, and can select one or more neural networks capable of speech recognition and/or machine translation. In these and other examples, the programs can configure the acceleration engine 1960 with the neural network to execute, and/or can select a neural network processing engine on the acceleration engine 1960 that has previously been configured to execute the desired neural network. In some examples, once the acceleration engine 1960 has started an inference on input data, the host processor 1972 can manage the movement of data (such as weights, instructions, intermediate results, results of conditional layers, and/or final results) into or out of the acceleration engine 1960.

In some examples, a software program that is using the acceleration engine 1960 to conduct an inference can read the result from a conditional layer from the acceleration engine 1960 and/or from a storage location, such as in DRAM 1930. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1930 is memory that is used by the host processor 1972 for storage of program code that the host processor 1972 is in the process of executing, as well as values that are being operated on. In some examples, the data for a neural network (e.g., weight values, instructions, and other data) can be all or partially stored in the DRAM 1930. DRAM is a common term for processor memory, and though DRAM is volatile memory, processor memory can be volatile and/or non-volatile. Though not illustrated here, the host system 1900 can include other volatile and non-volatile memories for other purposes. For example, the host system 1900 can include a Read-Only Memory (ROM) that stores boot code for booting the host system 1900 at power on, and/or Basic Input/Output System (BIOS) code.

Though not illustrated here, the DRAM 1930 can store instructions for various programs, which can be loaded into and be executed by the host processor 1972. For example, the DRAM 1930 can be storing instructions for an operating system, one or more data stores, one or more application programs, one or more drivers, and/or services for implementing the features disclosed herein.

The operating system can manage and orchestrate the overall operation of the host system 1900, such as scheduling tasks, executing applications, and/or controller peripheral devices, among other operations. In some examples, a host system 1900 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1900. For example, some drivers can provide communication between the operating system and peripheral devices or I/O devices 1932. Alternatively or additionally, some drivers may provide communication between application programs and the operating system, and/or application programs and peripheral devices accessible to the host system 1900. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1932 can include hardware for connecting to user input and output devices, such as keyboards, mice, pens, tablets, voice input devices, touch input devices, displays or monitors, speakers, and printers, among other devices. The I/O devices 1932 can also include storage drives and/or network interfaces for connecting to a network 1980. For example, the host system 1900 can use a network interface to communicate with storage devices, user terminals, other computing devices or servers, and/or other networks, among various examples.

In various examples, one or more of the I/O devices 1932 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1900 or may be in an external enclosure. A storage device can be fixed (e.g., attached by screws) or removable (e.g., having a physical release mechanism and possibly a hot-plug mechanism).

Storage devices, the DRAM 1930, and any other memory component in the host system 1900 are examples of computer-readable storage media. Computer-readable storage media are physical mediums that are capable of storing data in a format that can be read by a device such as the host processor 1972. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1932 can be PCI-based devices. In these examples, a PCI-based I/O device includes a PCI interface for communicating with the host system 1900. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1974 can include hardware for coordinating the operations of the acceleration engine 1960. For example, the support systems 1974 can include a microprocessor that coordinates the activities of the acceleration engine 1960, including moving data around on the acceleration engine 1960. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1972. In some examples, the program executed by the microprocessor is stored on the hardware of microprocessor, or on a non-volatile memory chip in the host system 1900. In some examples, the microprocessor and the acceleration engine 1960 can be on chip, such as one integrated circuit on the same die and in the same package.

In some examples, the support systems 1974 can be responsible for taking instructions from the host processor

1972 when programs executing on the host processor 1972 request the execution of a neural network. For example, the host processor 1972 can provide the support systems 1974 with a set of input data and a task that is to be performed on the set of input data. In this example, the support systems 1974 can identify a neural network that can perform the task, and can program the acceleration engine 1960 to execute the neural network on the set of input data. In some examples, the support systems 1974 only needs to select an appropriate neural network processing engine of the neural network processor. In some examples, the support systems 1974 may need to load the data for the neural network onto the acceleration engine 1960 before the acceleration engine 1960 can start executing the neural network. In these and other examples, the support systems 1974 can further receive the output of executing the neural network, and provide the output back to the host processor 1972.

In some examples, the operations of the support systems 1974 can be handled by the host processor 1972. In these examples, the support systems 1974 may not be needed and can be omitted from the host system 1900.

In various examples, the host system 1900 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1900 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method comprising:
    selecting an instruction from a data flow graph as an initial instruction in an ordered list of instructions;
    setting the initial instruction as a most recently committed instruction;
    determining a set of load instructions from the data flow graph to schedule;
    speculatively scheduling the set of load instructions into the ordered list of instructions;
    maintaining a list of speculatively scheduled load instructions, wherein each element in the list of speculatively scheduled load instructions includes a speculatively scheduled load instruction paired with the most recently committed instruction;
    for each speculatively scheduled load instruction in the list of speculatively scheduled load instructions:
        determining a computational instruction from the data flow graph that depends on the speculatively scheduled load instruction; and
        adding the speculatively scheduled load instruction to a list of load instructions that the computational instruction depends on;
    selecting a set of computational instructions from the data flow graph to schedule; and
    performing, for each computational instruction in the set of computational instructions, operations including:
        determining which one or more load instructions in the list of load instructions for the computational instruction is still in the list of speculatively scheduled load instructions; and
        for each of the one or more determined load instructions:
            scheduling the determined load instruction in the ordered list of instructions to follow the most recently committed instruction paired with the determined load instruction;
            setting the determined load instruction as the most recently committed instruction in remaining elements of the list of speculatively scheduled load instructions; and
            removing the determined load instruction from the list of speculatively scheduled load instructions.

2. The computer-implemented method of claim 1, wherein the data flow graph represents a neural network model.

3. The computer-implemented method of claim 1, wherein the ordered list of instructions is executed by a computing device having multiple execution engines including a pooling engine, an activation engine, and a processing array engine.

4. The computer-implemented method of claim 1, wherein the set of computational instructions is scheduled in order of increasing latency of the computational instructions.

5. A computer-implemented method comprising:
    scheduling an initial instruction from a data flow graph;
    determining a set of load instructions that follow the initial instruction in the data flow graph;
    speculatively scheduling the set of load instructions;
    selecting a set of computational instructions from the data flow graph, wherein each computational instruction being selected depends on a load instruction in the set of load instructions;
    scheduling the selected computational instructions; and
    reordering the set of load instructions to correspond to the order of the selected computational instructions.

6. The computer-implemented method of claim 5, further comprising generating a list of speculatively scheduled load instructions, wherein each speculatively scheduled load instruction in the list of speculatively scheduled load instructions is paired with a most recently committed instruction.

7. The computer-implemented method of claim 6, further comprising generating a list of load instructions that each selected computational instruction depends on.

8. The computer-implemented method of claim 7, wherein reordering the set of load instructions includes:
    performing, for each selected computational instruction, operations including:
        for each load instruction in the list of load instructions that the selected computational instruction depends on:
            scheduling the load instruction to follow the most recently committed instruction paired with the load instruction; and
            setting the scheduled load instruction as the most recently committed instruction in remaining elements of the list of speculatively scheduled load instructions.

9. The computer-implemented method of claim 8, wherein the operations further include removing the scheduled load instruction from the list of speculatively scheduled load instructions.

10. The computer-implemented method of claim 5, wherein the data flow graph represents instructions for execution on a computing device having multiple execution engines include a pooling engine, an activation engine, and a processing array engine.

11. The computer-implemented method of claim 5, wherein the selected computational instructions are scheduled in order of increasing latency of the selected computational instructions.

12. The computer-implemented method of claim 5, wherein the data flow graph represents a neural network model.

13. A non-transitory computer readable medium having stored therein instructions that, when executed by one or more processors, cause the one or more processors to execute a compiler, the compiler configured to perform operations including:
    scheduling an initial instruction from a data flow graph;
    determining a set of load instructions that follow the initial instruction in the data flow graph;

speculatively scheduling the set of load instructions;
selecting a set of computational instructions from the data flow graph, wherein each computational instruction being selected depends on a load instruction in the set of load instructions;
scheduling the selected computational instructions; and
reordering the set of load instructions to correspond to the order of the selected computational instructions.

14. The non-transitory computer readable medium of claim 13, wherein the operations further include generating a list of speculatively scheduled load instructions, wherein each speculatively scheduled load instruction in the list of speculatively scheduled load instructions is paired with a most recently committed instruction.

15. The non-transitory computer readable medium of claim 14, wherein the operations further include generating a list of load instructions that each selected computational instruction depends on.

16. The non-transitory computer readable medium of claim 15, wherein reordering the set of load instructions includes:
performing, for each selected computational instruction, sub-operations including:
for each load instruction in the list of load instructions that the selected computational instruction depends on:
scheduling the load instruction to follow the most recently committed instruction paired with the load instruction; and
setting the scheduled load instruction as the most recently committed instruction in remaining elements of the list of speculatively scheduled load instructions.

17. The non-transitory computer readable medium of claim 16, wherein the sub-operations further include removing the scheduled load instruction from the list of speculatively scheduled load instructions.

18. The non-transitory computer readable medium of claim 13, wherein the data flow graph represents instructions for execution on a computing device having multiple execution engines including a pooling engine, an activation engine, and a processing array engine.

19. The non-transitory computer readable medium of claim 13, wherein the selected computational instructions are scheduled in order of increasing latency of the selected computational instructions.

20. The non-transitory computer readable medium of claim 13, wherein the data flow graph represents a neural network model.

* * * * *